US012560437B2

(12) United States Patent
Dormody et al.

(10) Patent No.: US 12,560,437 B2
(45) Date of Patent: Feb. 24, 2026

(54) ESTIMATING FLOOR NUMBERS AND FLOOR LABELS IN A STRUCTURE

(71) Applicant: NextNav, LLC, Sunnyvale, CA (US)

(72) Inventors: Michael Dormody, San Jose, CA (US); Badrinath Nagarajan, Cupertino, CA (US); Guiyuan Han, San Jose, CA (US); Arun Raghupathy, Bangalore (IN)

(73) Assignee: NextNav, LLC, Santa Clara, CA (US)

( * ) Notice: Subject to any disclaimer, the term of this patent is extended or adjusted under 35 U.S.C. 154(b) by 341 days.

(21) Appl. No.: 18/322,874

(22) Filed: May 24, 2023

(65) Prior Publication Data

US 2023/0384087 A1 Nov. 30, 2023

Related U.S. Application Data

(60) Provisional application No. 63/365,357, filed on May 26, 2022.

(51) Int. Cl.
G01C 21/20 (2006.01)
G01C 5/06 (2006.01)
(Continued)

(52) U.S. Cl.
CPC .............. G01C 21/206 (2013.01); G01C 5/06 (2013.01); G01C 21/3893 (2020.08); H04W 4/33 (2018.02)

(58) Field of Classification Search
CPC .......... G01C 21/206; G01C 5/00; G01C 5/06; G01C 21/3893; H04W 4/33
See application file for complete search history.

(56) References Cited

U.S. PATENT DOCUMENTS

| | | | |
|---|---|---|---|
| 5,058,427 A | 10/1991 | Brandt | |
| 2014/0114567 A1* | 4/2014 | Buchanan | G01C 21/005 |
| | | | 701/454 |

(Continued)

FOREIGN PATENT DOCUMENTS

| | | | | |
|---|---|---|---|---|
| CN | 110926473 A | * | 3/2020 | G01L 11/00 |

OTHER PUBLICATIONS

International Search Report and Written Opinion dated Sep. 25, 2023 for PCT Patent Application No. PCT/IB2023/055352.

(Continued)

*Primary Examiner* — Benjamin R Schmitt

(74) *Attorney, Agent, or Firm* — MLO, a professional corp.

(57) ABSTRACT

A method involves selecting a set of altitude envelope distribution constraints for a building and generating a set of altitude envelope distributions for the building in accordance with the constraints. Each altitude envelope distribution includes one or more first altitude envelopes. An aggregate altitude envelope distribution is generated for the building using the set of altitude envelope distributions and in accordance with the constraints. The aggregate altitude envelope distribution includes one or more second altitude envelopes. A reference altitude of the building is determined, and an absolute aggregate altitude envelope distribution is determined using the reference altitude and the aggregate altitude envelope distribution. The aggregate altitude envelope distribution includes one or more third altitude envelopes, each corresponding to a respective estimated floor number of the building.

20 Claims, 22 Drawing Sheets

(51) Int. Cl.
    *G01C 21/00*       (2006.01)
    *H04W 4/33*       (2018.01)

(56)            References Cited

U.S. PATENT DOCUMENTS

| | | | |
|---|---|---|---|
| 2016/0198431 A1* | 7/2016 | Pattabiraman | H04B 7/22 |
| | | | 455/418 |
| 2018/0070213 A1* | 3/2018 | Ali | H04W 4/026 |
| 2018/0245916 A1 | 8/2018 | Ivanov et al. | |
| 2019/0371054 A1 | 12/2019 | Young et al. | |

OTHER PUBLICATIONS

Lostanlen Y et al: "Multi-environment radio predictions involving an in-building wlan network and outdoor umts base stations", Personal, Indoor and Mobile Radio Communications, 2004. PIMRC 2004. 15 th IEEE International Symposium on Barcelona, Spain Sep. 5-8, 2004, Piscataway, NJ, USA, IEEE, Piscataway, NJ, USA, vol. 3, Sep. 5, 2004 (Sep. 5, 2004), pp. 1553-1557, XP010754202, DOI: 10.1109/PIMRC.2004. 1368260 ISBN: 978-0-7803-8523-8 section III.

Saroglou Tanya et al: "Towards energy efficient skyscrapers", Energy, Elsevier, Amsterdam, NL, vol. 149, May 24, 2017 (May 24, 2017), pp. 437-449, XP085132574, ISSN: 0378-7788, DOI: 10.1016/J.ENBUILD.2017.05.057 section 3.1.

Invitation to Pay Additional Fees and, Where Applicable, Protest fee for International Application No. PCT/IB2025/053969 dated Jul. 22, 2025.

\* cited by examiner

| Altitude Envelope Min (meters) | Altitude Envelope Max (meters) | Floor Number |
|---|---|---|
| 0 | 2.7 | 1 |
| 3 | 5.7 | 2 |
| 6 | 8.7 | 3 |
| 9 | 11.7 | 4 |

| Alt Env Min (meters) (2.5 m) | Alt Env Max (meters) (2.5 m) | Alt Env Min (meters) (3 m) | Alt Env Max (meters) (3 m) | Floor Number |
|---|---|---|---|---|
| 0 | 2.2 | 0 | 2.7 | 1 |
| 2.5 | 4.7 | 3 | 5.7 | 2 |
| 5 | 7.2 | 6 | 8.7 | 3 |
| 7.5 | 9.7 | 9 | 11.7 | 4 |

Distribution 1: Assumes floor-to-ceiling separation of 2.2 m and a boundary thickness of 0.3 m Distribution 2: Assumes floor-to-ceiling separation of 2.7 m and a boundary thickness of 0.3 m

| Alt Env Min (meters) | Alt Env Max (meters) | Floor Number |
|---|---|---|
| 0 | 2.7 | 1 |
| 2.5 | 5.7 | 2 |
| 5 | 8.7 | 3 |
| 7.5 | 11.7 | 4 |

Figure 14:
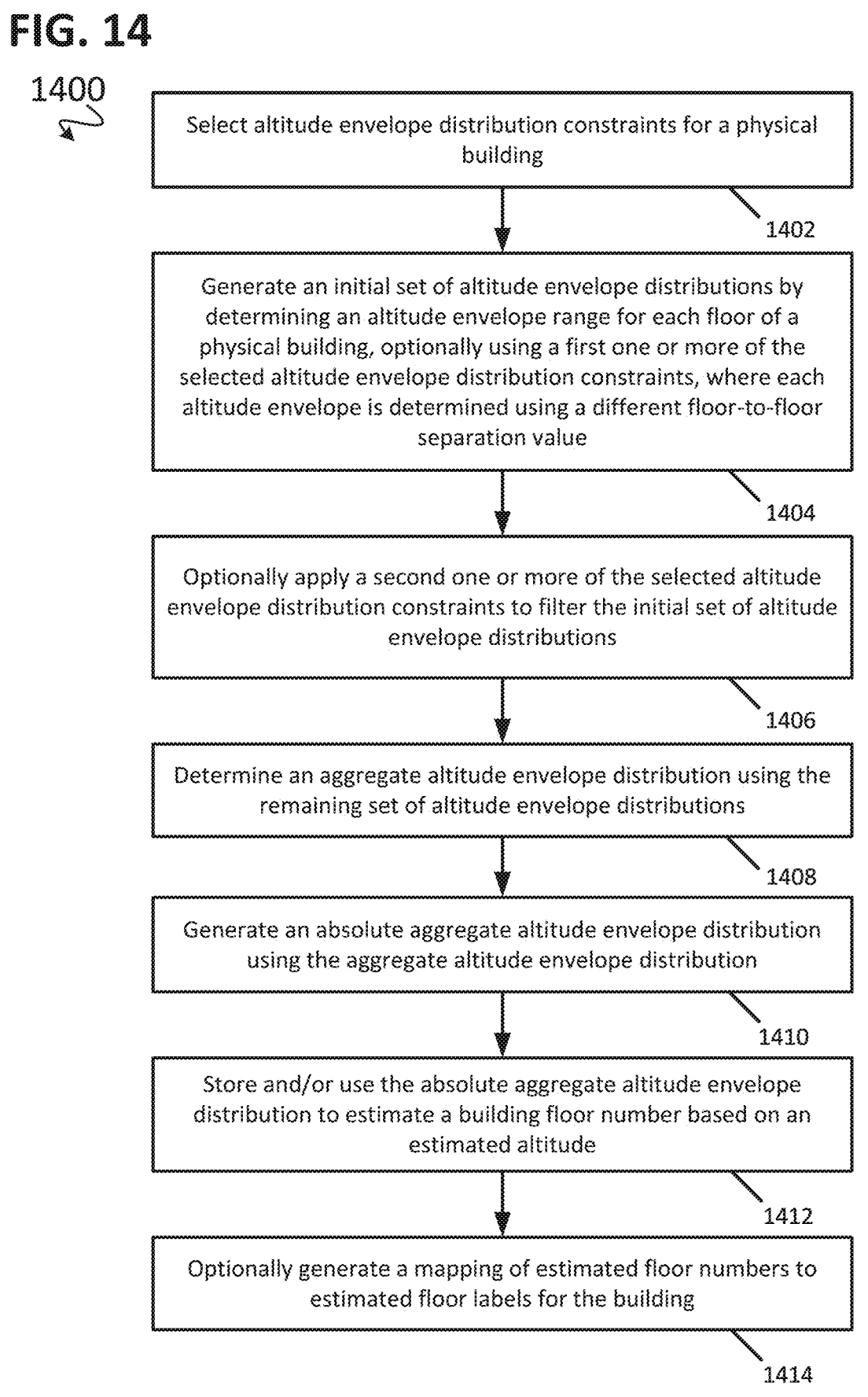

Select altitude envelope distribution constraints for a physical building

1402

Generate an initial set of altitude envelope distributions by determining an altitude envelope range for each floor of a physical building, optionally using a first one or more of the selected altitude envelope distribution constraints, where each altitude envelope is determined using a different floor-to-floor separation value

1404

Optionally apply a second one or more of the selected altitude envelope distribution constraints to filter the initial set of altitude envelope distributions

1406

Determine an aggregate altitude envelope distribution using the remaining set of altitude envelope distributions

1408

Generate an absolute aggregate altitude envelope distribution using the aggregate altitude envelope distribution

1410

Store and/or use the absolute aggregate altitude envelope distribution to estimate a building floor number based on an estimated altitude

1412

Optionally generate a mapping of estimated floor numbers to estimated floor labels for the building

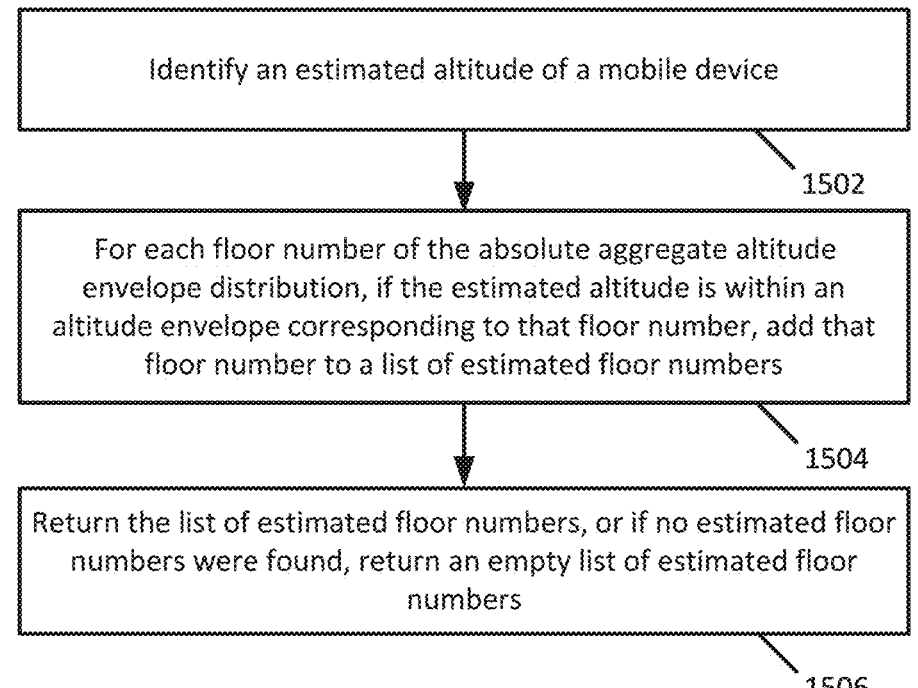

Identify an estimated altitude of a mobile device

1502

For each floor number of the absolute aggregate altitude envelope distribution, if the estimated altitude is within an altitude envelope corresponding to that floor number, add that floor number to a list of estimated floor numbers

1504

Return the list of estimated floor numbers, or if no estimated floor numbers were found, return an empty list of estimated floor numbers

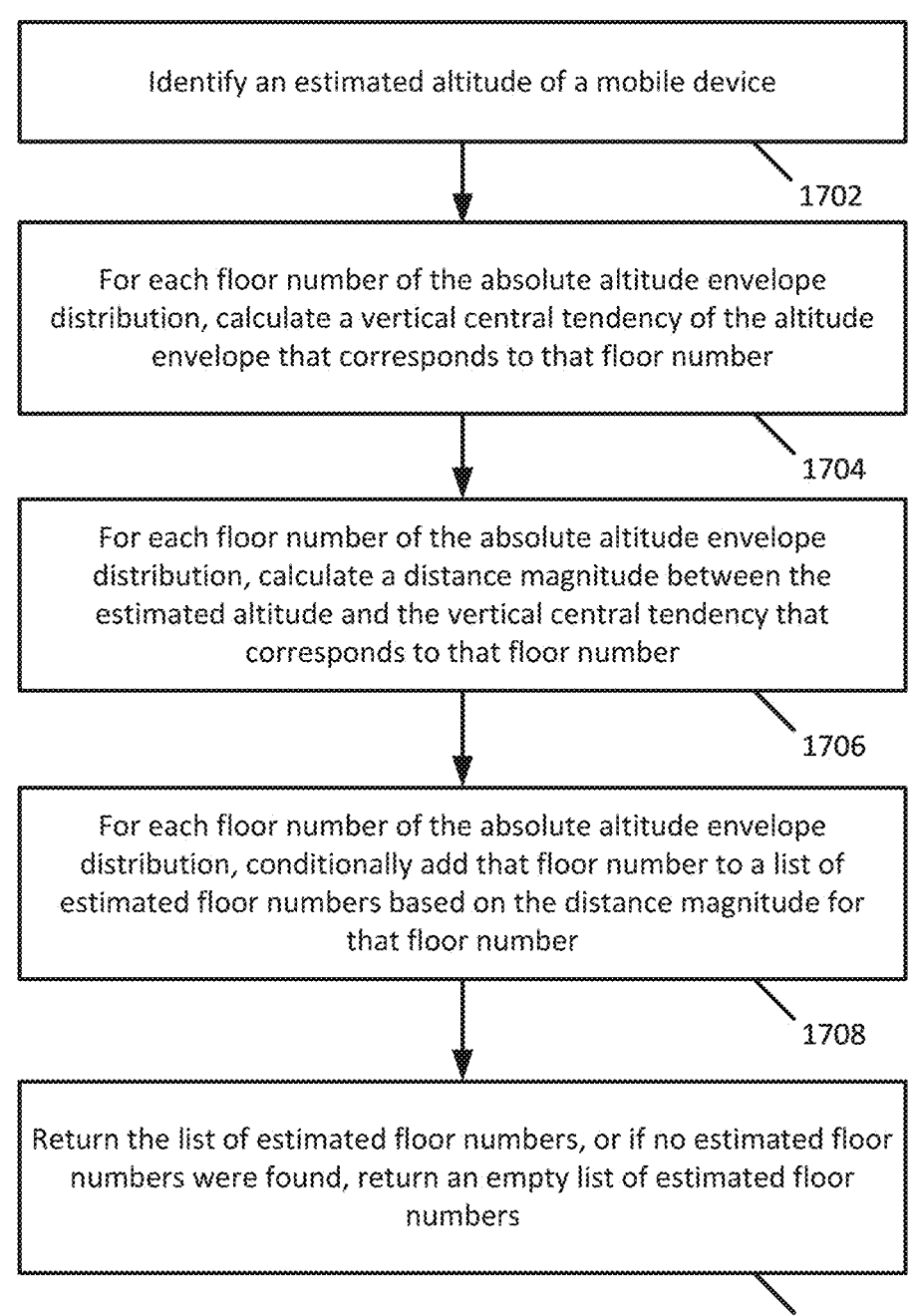

Identify an estimated altitude of a mobile device

1702

For each floor number of the absolute altitude envelope distribution, calculate a vertical central tendency of the altitude envelope that corresponds to that floor number

1704

For each floor number of the absolute altitude envelope distribution, calculate a distance magnitude between the estimated altitude and the vertical central tendency that corresponds to that floor number

1706

For each floor number of the absolute altitude envelope distribution, conditionally add that floor number to a list of estimated floor numbers based on the distance magnitude for that floor number

1708

Return the list of estimated floor numbers, or if no estimated floor numbers were found, return an empty list of estimated floor numbers

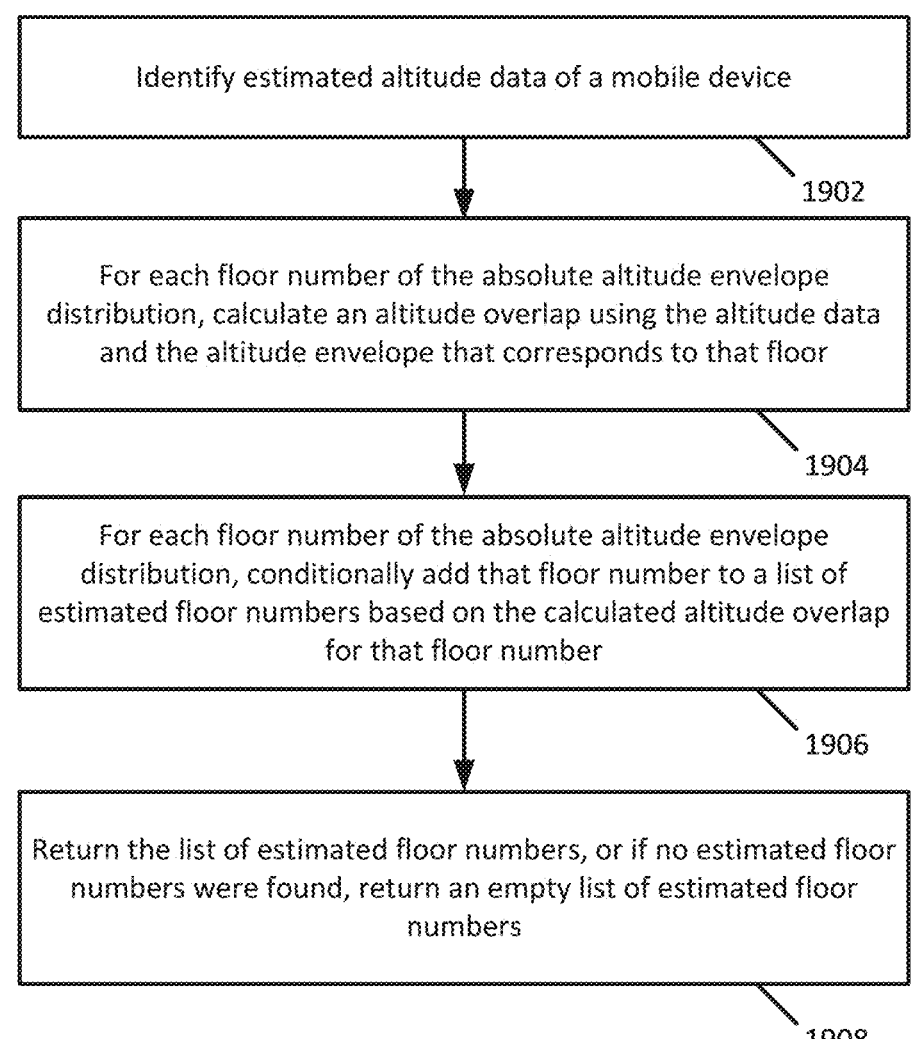

Identify estimated altitude data of a mobile device

1902

For each floor number of the absolute altitude envelope distribution, calculate an altitude overlap using the altitude data and the altitude envelope that corresponds to that floor

1904

For each floor number of the absolute altitude envelope distribution, conditionally add that floor number to a list of estimated floor numbers based on the calculated altitude overlap for that floor number

1906

Return the list of estimated floor numbers, or if no estimated floor numbers were found, return an empty list of estimated floor numbers

1908

2100

Map all estimated floor numbers of a building to identically named estimated floor labels

2102

Remove floor labels from the mapping based on regional/cultural criteria

2104

Sufficient number of floor labels?      2106

NO → Increment number of floor labels      2112

YES

Add new floor labels at appropriate places in the mapping      2108

Align floor numbers to floor labels      2110

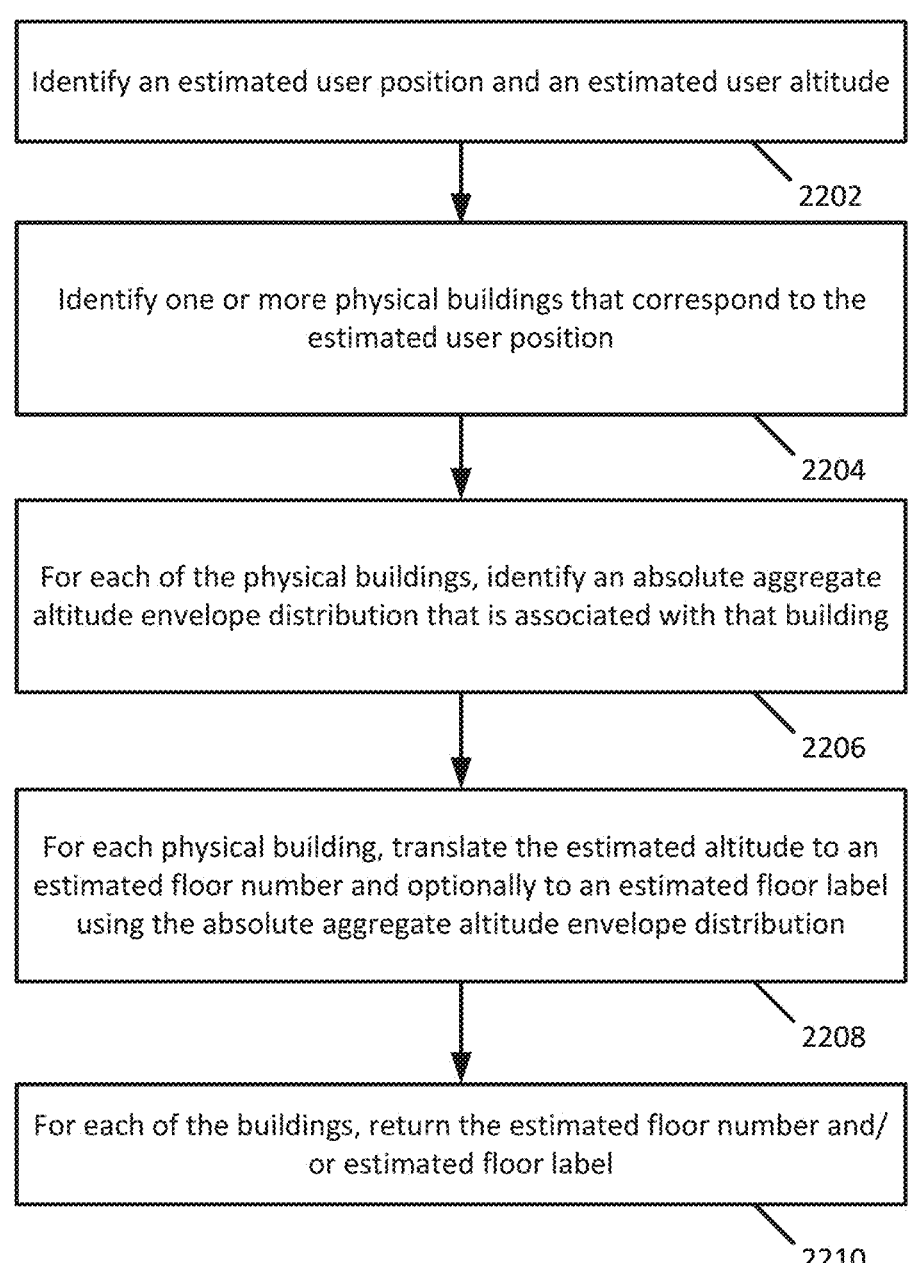

Identify an estimated user position and an estimated user altitude

2202

Identify one or more physical buildings that correspond to the estimated user position

2204

For each of the physical buildings, identify an absolute aggregate altitude envelope distribution that is associated with that building

2206

For each physical building, translate the estimated altitude to an estimated floor number and optionally to an estimated floor label using the absolute aggregate altitude envelope distribution

2208

For each of the buildings, return the estimated floor number and/ or estimated floor label

2210

2300

ESTIMATING FLOOR NUMBERS AND FLOOR LABELS IN A STRUCTURE

RELATED APPLICATIONS

This application claims priority to U.S. Provisional Patent Application No. 63/365,357, filed May 26, 2022, all of which is hereby incorporated by reference in its entirety for all purposes.

BACKGROUND

Determining the exact location of a mobile device (e.g., a smartphone operated by a user) in an environment can be quite challenging, especially when the mobile device is located in an urban environment where locations may exist above terrain (e.g., within a building). Imprecise estimates of the mobile device's altitude may have life-or-death consequences for the user of the mobile device since the imprecise altitude estimate can delay emergency personnel response times as they search for the user on multiple floors of a building. In less dire situations, imprecise altitude estimates can lead a user to the wrong area in an environment.

In practice, an estimated altitude of a mobile device is often provided or displayed relative to a frame of reference. Typically, an altitude relative to Earth's surface is the height above ellipsoid (HAE) or above mean sea level (AMSL). However, these values may not be useful to an end user as it assumes that the user can interpret the altitude value, which may or may not be intuitive.

Other methods of reporting altitude include: i) height above sea-level which is known as Mean Sea Level and is determined by using the geoid (a model of global mean sea level that is used to measure precise surface elevations), ii) height above terrain (HAT) which is determined using a terrain database, and iii) floor number, which is often most useful for a user, especially when inside a structure.

While the first two methods are readily available from geoid and terrain databases respectively, the third method is not easily available as it relies on widespread and exhaustive databases of building floor levels that may be constructed using time-consuming and expensive survey operations.

SUMMARY

In some embodiments, a method involves selecting a set of altitude envelope distribution constraints for a physical building. A set of altitude envelope distributions for the physical building is generated in accordance with the set of altitude envelope distribution constraints, each altitude envelope distribution comprising one or more first altitude envelopes, and each of the first altitude envelopes corresponding to a respective estimated floor number of the physical building. An aggregate altitude envelope distribution is generated for the physical building using the set of altitude envelope distributions and in accordance with the set of altitude envelope distribution constraints, the aggregate altitude envelope distribution comprising one or more second altitude envelopes, each of the one or more second altitude envelopes corresponding to a respective estimated floor number of the physical building. A reference altitude is determined for the physical building, and an absolute aggregate altitude envelope distribution is determined using the reference altitude and the aggregate altitude envelope distribution, the aggregate altitude envelope distribution comprising one or more third altitude envelopes, each of the third altitude envelopes corresponding to a respective estimated floor number of the physical building.

In some embodiments, a system includes one or more servers that are operable to select a set of altitude envelope distribution constraints for a physical building, and generate a set of altitude envelope distributions for the physical building in accordance with the set of altitude envelope distribution constraints. Each altitude envelope distribution comprises one or more first altitude envelopes, each of the first altitude envelopes corresponding to a respective estimated floor number of the physical building. An aggregate altitude envelope distribution for the physical building is generated using the set of altitude envelope distributions and in accordance with the set of altitude envelope distribution constraints, the aggregate altitude envelope distribution comprising one or more second altitude envelopes, where each of the one or more second altitude envelopes corresponds to a respective estimated floor number of the physical building. A reference altitude of the physical building is determined, and an absolute aggregate altitude envelope distribution is determined using the reference altitude and the aggregate altitude envelope distribution, the aggregate altitude envelope distribution comprising one or more third altitude envelopes, where each of the one or more third altitude envelopes corresponds to a respective estimated floor number of the physical building.

BRIEF DESCRIPTION OF THE DRAWINGS

FIG. 2 shows a simplified example of building models that correspond to a physical building of FIG. 1, in accordance with some embodiments.

FIG. 3 shows a table of example altitude envelope ranges, in accordance with some embodiments.

FIG. 4 shows a table of example distributions of altitude envelope ranges, in accordance with some embodiments.

FIG. 5 shows a table of example aggregate altitude envelope values, in accordance with some embodiments.

FIG. 14 shows a simplified example of a portion of a process for determining an aggregate altitude distribution, in accordance with some embodiments.

FIG. 15 simplified example of a portion of a process for estimating a building floor number based on an estimated altitude, in accordance with some embodiments.

FIG. 17 includes a simplified example of a portion of a process for estimating a building floor number based on an estimated altitude, in accordance with some embodiments.

FIG. 19 includes a simplified example of a portion of a process for estimating a building floor number based on an estimated altitude, in accordance with some embodiments.

FIG. 22 includes a simplified example of a portion of a process for estimating a building floor number based on an estimated altitude, in accordance with some embodiments.

DETAILED DESCRIPTION

Figure 1:
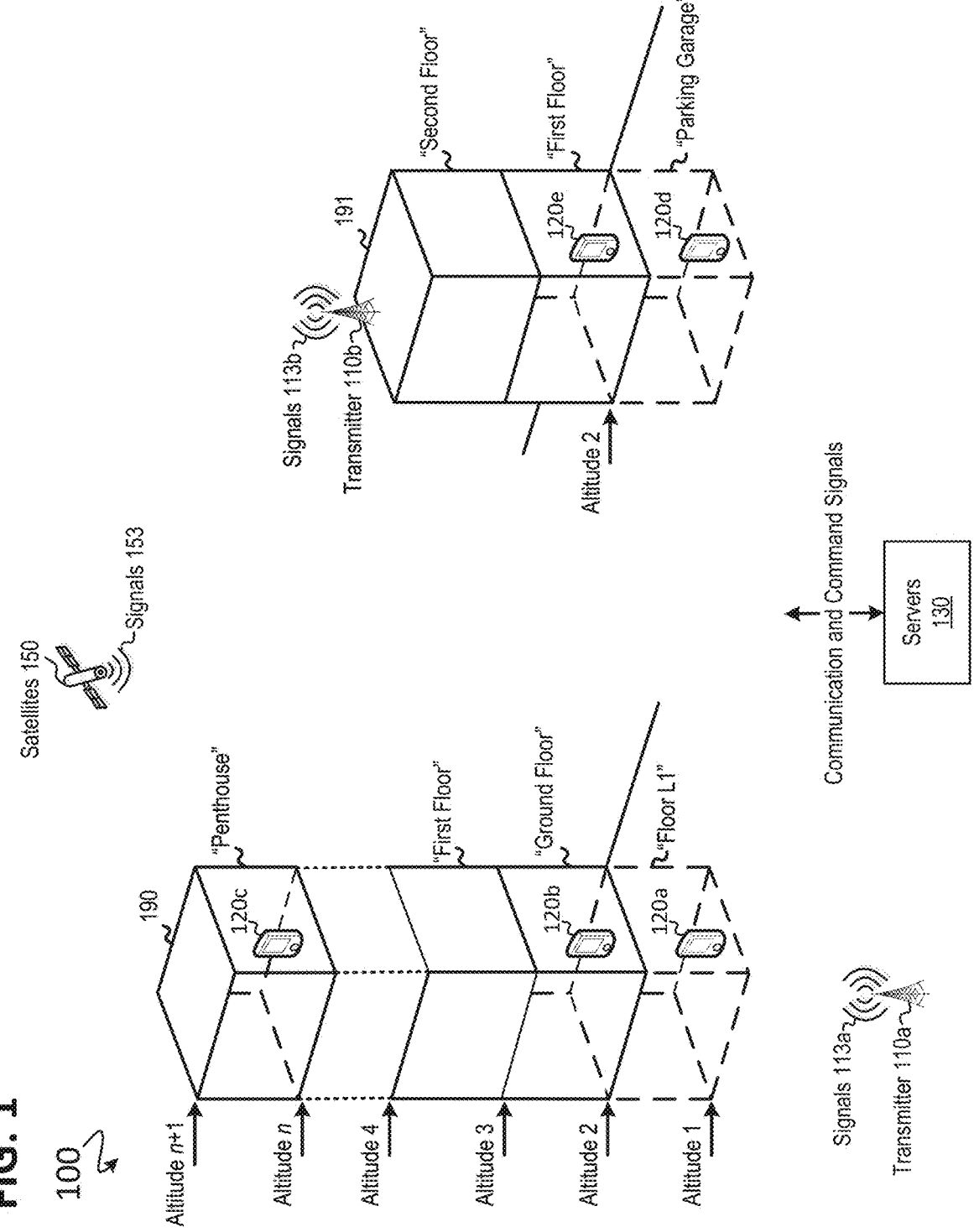
FIG. 1 shows a simplified operational environment for estimating a building floor number and/or a floor label of a mobile device, in accordance with some embodiments.

Disclosed herein are methods to estimate floor designators, such as floor numbers and/or floor labels, of a structure and to "map" (i.e., logically associate or link) the estimated floor designators to corresponding estimated altitudes. Such structures include buildings, parking garages, monuments, and other structures. Such structures are referred to herein as "buildings", but the term is understood to mean any structure having one or more stories. The mapped estimated building floor designators may be added to a database for later retrieval. Upon retrieval, the estimated building floor designators may be used to convert an estimated altitude of a mobile device to an estimated floor number and/or floor label. For example, in a situation where a user calls an emergency service such as 911 from a high-rise office building, a floor designator that indicates which floor of the building the user is on may be significantly more useful to first responders trying to reach the user as compared to receiving a raw estimated altitude value reported by the user's mobile device.

As disclosed herein, estimating the floor designators and mapping them to corresponding altitudes is advantageously performed computationally and does not require a costly building survey to create such mapped values for each physical building. The estimated building floor designators include estimated building "floor numbers" and/or estimated building "floor labels". The floor numbers and floor labels are referred to as being "estimated" because they may be largely determined computationally as compared to being determined based on a physical survey of a building. However, in some embodiments, crowd-sourced and surveyed data may be included in the mapped data and thus some of the mapped estimated building floor designators may be mapped based on user or surveyor provided data. The selection of which floor designator to use can come from either estimated values, mapped values, or a combination of the two.

As referred to herein, a floor label is distinct from a floor number. The distinction is drawn because floor labels as observed by a user may not reflect the true floor number count (e.g., counting from the ground up) and can vary from country-to-country and morphology-to-morphology. For example, in the United States, the floor label "1st Floor" corresponds to a ground-level floor and the floor label "2nd Floor" corresponds to a first floor above the ground level. In other countries, the floor label "1st Floor" corresponds to the first floor above the ground level floor, and "Ground Floor" corresponds to the ground level. For example, in Montreal, Canada, the ground floor is labeled "RC" for "Rez-de-chausée", which is the French phrase for the ground floor. In another example, the floor label "13th Floor" is often omitted owing to the stigma associated with the number 13, despite there actually being a 13th floor. In yet another example, any floor label containing the number 4 is omitted in some countries or cultures owing to the stigma associated with the number 4, despite there actually being floor numbers 4, 24, 34, 40, and so on. The preceding provides several common examples, but is not an exhaustive list of all variations.

FIG. 1 shows a simplified operational environment 100 for estimating a floor number and/or floor label of a mobile device, in accordance with some embodiments. The operational environment includes a first building 190, a second building 191, mobile devices 120a-e, satellites 150, a network of terrestrial transmitters 110a-b, and servers 130. Also shown are positioning signals 153 from the satellites 150, positioning signals 113a-b from the respective transmitters 110a-b, altitude designators altitude 1 through n+1, and communication and command signals associated with the servers 130.

As was discussed above, building floor labels may vary from building-to-building. For example, the building 190 includes floors labeled, in order of lowest to highest, "Floor L1", "Ground Floor", "First Floor", and "Penthouse". By comparison, the building 191 includes floors labeled, in order of lowest to highest, "Parking Garage", "First Floor", and "Second Floor". Thus, even though the mobile device 120b and the mobile device 120e are both at altitude level Altitude 2, and even though the mobile device 120b and the mobile device 120e are both at street level in their respective buildings, the mobile device 120b is on a building floor labeled "Ground Floor", whereas the mobile device 120e is on a building floor labeled "First Floor".

Each of the transmitters 110a-b and the mobile devices 120a-e may be located at different altitudes or depths that are inside or outside various natural or manmade structures (e.g., the buildings 190/191), relative to different terrain. The positioning signals 113a-b and 153 are respectively transmitted from the transmitters 110a-b and satellites 150, and are subsequently received by the mobile device 120 using known transmission technologies. Though only two terrestrial transmitters are shown for simplicity, it is understood that the network of terrestrial transmitters 110a-b may include many more than two transmitters. Similarly, although only one satellite is shown for simplicity, it is understood that the satellites 150 may include many more than one satellite.

Figure 24:
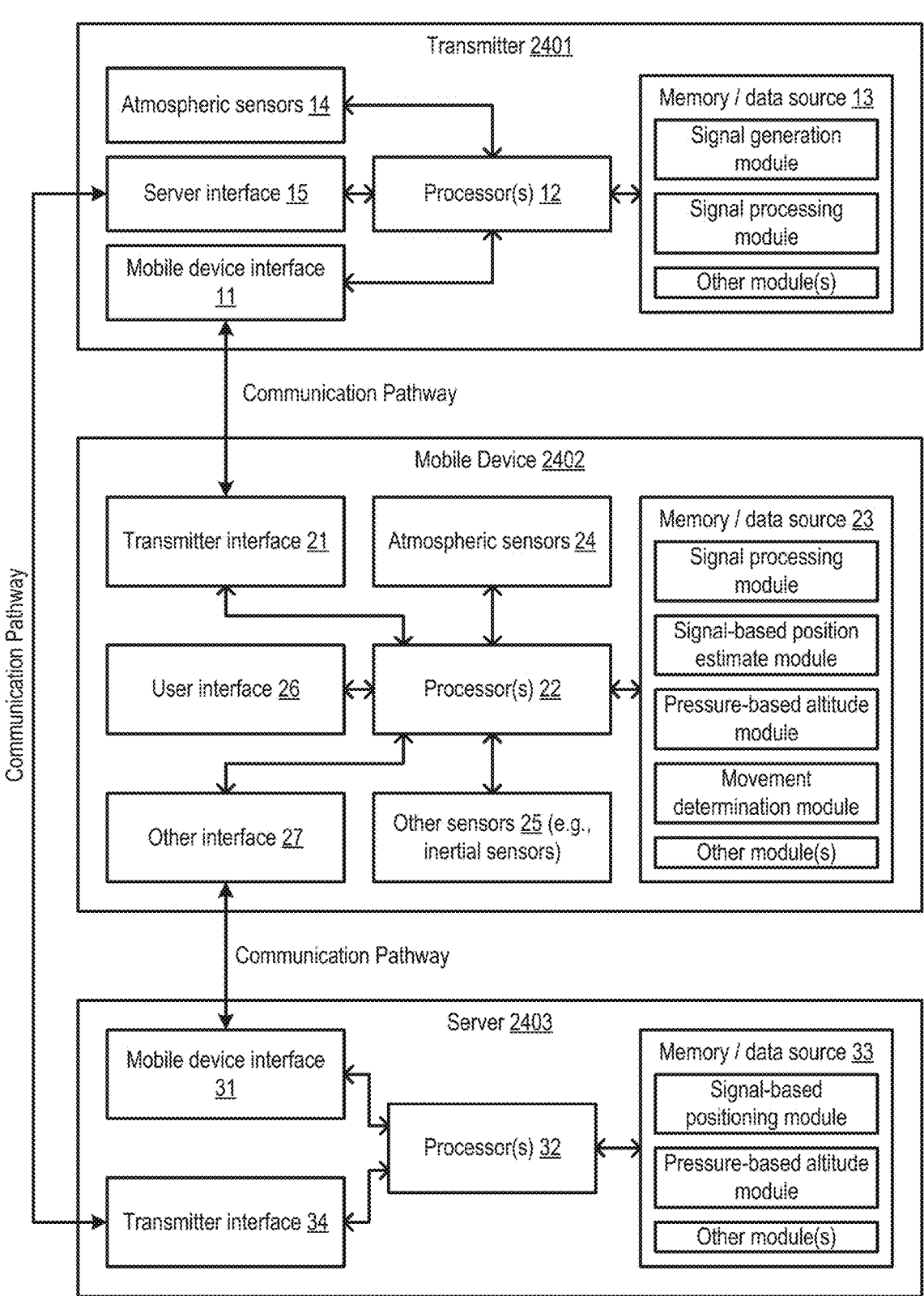
FIG. 24 shows simplified implementations of transmitters, mobile devices, and servers of the operational environment shown in FIG. 1, in accordance with some embodiments.

The transmitters 110a-b may transmit the signals 113a-b using one or more common multiplexing parameters that utilize time slots, pseudorandom sequences, frequency offsets, or other approaches, as is known in the art or otherwise disclosed herein. The mobile devices 120a-e may take different forms, including a mobile phone or another wireless communication device, a portable computer, a navigation device, a tracking device, a receiver, or another suitable device that can receive the signals 113a-b and/or 153. Examples of possible components in the transmitters 110a-b, the mobile device 120, and the server 130 are shown in FIG. 24 and discussed below. In particular, each transmitter 110a-b and mobile device 120a-e may include atmospheric sensors (e.g., atmospheric pressure, temperature, and/or humidity sensors, weather stations, etc.) for generating measurements of atmospheric conditions (e.g., atmospheric pressure and temperature) that are used to estimate an unknown altitude of the mobile devices 120a-e.

Different approaches exist for estimating an altitude of a mobile device. In a barometric-based positioning system, altitude can be computed using a measurement of pressure from a calibrated pressure sensor of a mobile device along with ambient pressure measurement(s) from a network of calibrated reference pressure sensors and a measurement of ambient temperature from the network or other source. An estimate of an altitude of a mobile device ($h_{mobile}$) can be computed by the mobile device, a server, or another machine that receives needed information as follows:

$$h_{mobile} = h_{sensor} - \frac{RT_{remote}}{gM} \ln\left(\frac{P_{sensor}}{P_{mobile}}\right),$$ (Equation 1)

where P mobile is the estimate of pressure at the location of the mobile device by a pressure sensor of the mobile device, $P_{sensor}$ is an estimate of pressure at the location of a reference pressure sensor that is accurate to within a tolerated amount of pressure from true pressure (e.g., less than 5 Pa), $T_{remote}$ is an estimate of temperature (e.g., in Kelvin) at the location of the reference pressure sensor or a different location of a remote temperature sensor, $h_{sensor}$ is an estimated altitude of the reference pressure sensor that is estimated to within a desired amount of altitude error (e.g., less than 1.0 meters), g corresponds to the acceleration due to gravity (e.g., −9.8 m/s²), R is a gas constant, and M is the molar mass of air (e.g., dry air or other). The minus sign (−) may be substituted with a plus sign (+) in alternative embodiments of Equation 1, as would be understood by one of ordinary skill in the art (e.g., g=9.8 m/s²). The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor. The reference-level pressure can be determined as follows:

$$P_{ref} = P_{sensor} \times \exp\left(\frac{gM(h_{ref} - h_{sensor})}{RT_{remote}}\right),$$ (Equation 2)

where $P_{sensor}$ is the estimate of pressure at the location of the reference pressure sensor, $P_{ref}$ is the reference-level pressure estimate, and h ref is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

As disclosed herein, a building model that corresponds to a physical building is computationally constructed of individual "stacked" floors. That is, a building model is "constructed" by computationally determining vertical boundaries and/or offsets for each floor of a building model and accumulating those vertical boundaries and/or offsets. The term "building floor number" is taken to mean the level in a building, not the actual surface upon which a user will stand. The physical space the user could possibly occupy on a floor is referred to herein as an "altitude envelope" which is bounded by the lowest surface of the floor (i.e., the "ground" of that floor) and the ceiling of that floor, with the bounds separated by a ground-to-ceiling separation.

An altitude envelope of a first floor is "stacked" on top of or below that of a second floor with an appropriate intervening floor/ceiling separation value (a "boundary thickness") by logically and or mathematically associating the first floor and the second floor. The boundary thickness can be a thickness of the floor or a thickness of the ceiling, depending on a chosen convention. As a simple example, a building model having two stacked floors may have a building model height value that is equal to the cumulative height of each of the floors. Or, a building model having two stacked floors may have a building height value that is just equal to the height of the topmost stacked floor if the lowest floor is modeled as a basement.

In some embodiments, altitude envelopes of each floor of a building model are stacked on top of either a lowest starting point of the building model or on top of that of another floor. In other embodiments, each floor of a building model is stacked below either a highest starting point of the building model or below another floor. Each floor includes a vertical distance called a floor-to-floor separation. The floor-to-floor separation includes a ground-to-ceiling separation of the floor as well as the boundary thickness.

Figure 2:
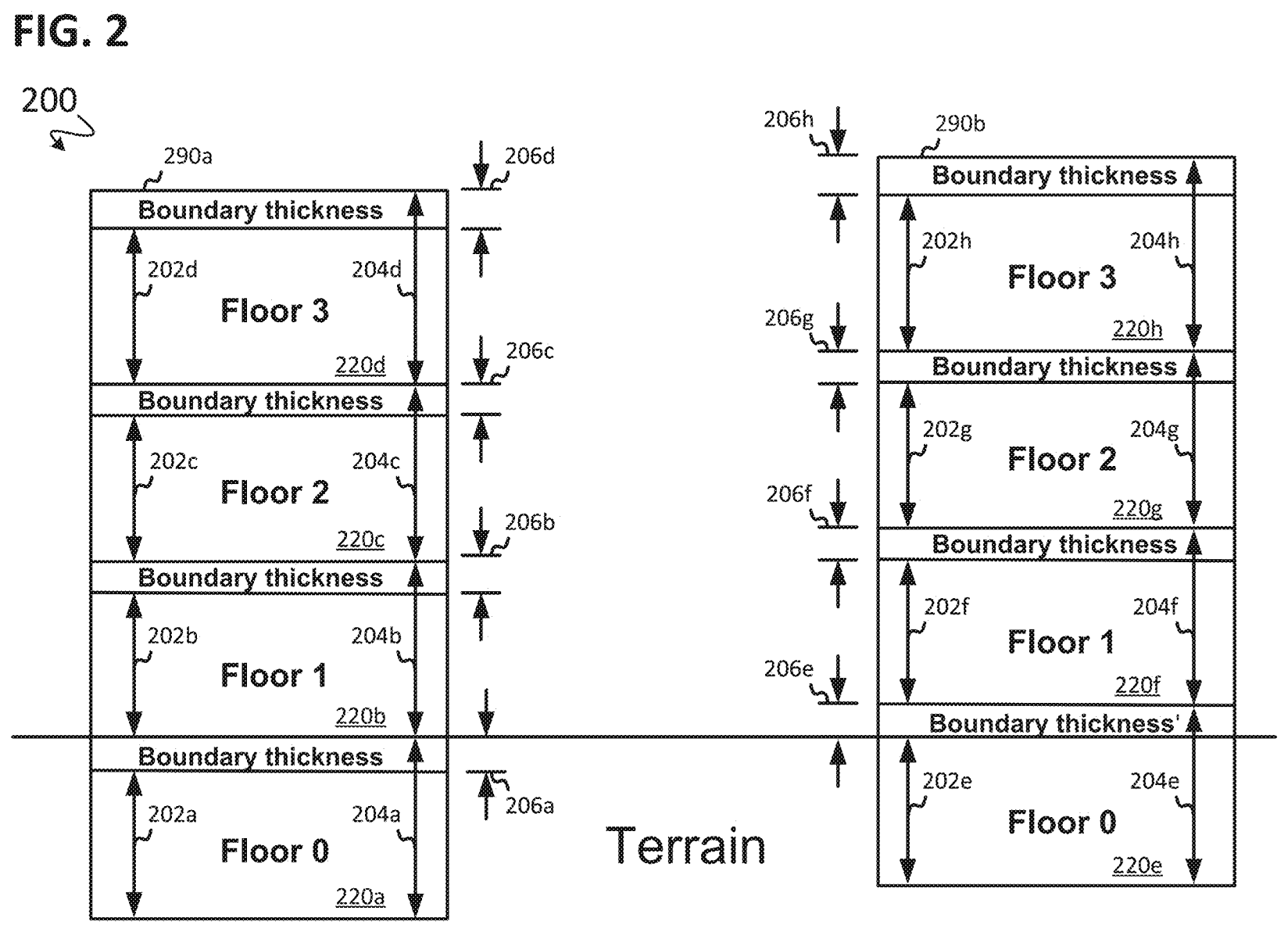

FIG. 2 shows a simplified example 200 of building models 290a and 290b that correspond to a physical building (e.g., the building 190 of FIG. 1), in accordance with some embodiments. A first building model 290a includes floors 220a-d, boundary thickness values 206a-d, ground-to-ceiling separation values 202a-d, and floor-to-floor separation values 204a-d. A second building model 290b includes floors 220e-h, boundary thickness values 206e-h, ground-to-ceiling separation values 202e-h, and floor-to-floor separation values 204e-h. Floors labeled Floor 0 are assumed to be subterranean. The ground surface of the floor 220b labeled Floor 1 of the building model 290a is assumed to align vertically with a top surface of the terrain. By comparison, the ground surface of the floor 220f labeled Floor 1 of the building model 290b is assumed to be offset from a top surface of the terrain by a boundary thickness value 206e labeled Boundary thickness'.

In some embodiments, the floor-to-floor separation values are assumed to be uniform throughout a building model. In other embodiments, the floor-to-floor separation values are assumed to be non-uniform in some or all portions of a building model. For example, a floor-to-floor separation value may be larger for a subset of floors (e.g., when modeling the lobby of a hotel).

In some embodiments, boundary thickness values are assumed to be uniform throughout a building model. In other embodiments, the boundary thickness values are assumed to be non-uniform in some, or all, portions of a building model. For example, a boundary thickness value may be larger for a subset of floors, such as when modeling the ceiling above a lobby, the floor below a large meeting room, etc. The boundary thickness value at the top of a building model (also known as the roof thickness) (e.g., 206d and 206h) can also be larger than the boundary thickness value in the rest of the building model.

In some embodiments, less typically populated places in homes where a person could be physically located, such as in an attic or a crawl space, are considered. Attics are generally located above a top floor of a building but below the roof. Attics often do not have horizontally flat ceilings and are bounded by the roof and the floor/ceiling thickness above the top floor. Crawl spaces are small areas that have little vertical clearance that typically sit below a building and are used to run wiring, cables, pipes, etc.

To account for attics when modeling a physical building, in some embodiments an additional floor with a typically smaller maximum floor-to-ceiling separation value is added near the top of the estimated floors. In some embodiments, if a building database provides statistics on a building's height, such as maximum height (corresponding to the very top of the roof) or minimum height (corresponding to the roof line, or the lowest point of a roof), a difference above a threshold (e.g. 2 meters) could be calculated. The calculated difference could then be used to determine if it is likely that the roof is sloped and thus may contain an attic space. This may be more typical of residences than businesses. If a building database does not provide a minimum and maximum building height, then the given height of the building could be either minimum/maximum, or some metric in between, such as a mean or median.

In some embodiments, if a building database provides only one height for a building, and it is unknown whether the provided height corresponds to a maximum height or minimum height of that building (i.e., the roof line), it may then be inferred whether the provided height corresponds to the maximum or minimum height based on building morphology, architectural trends, building codes (i.e., city rules), building information, or other information. For example, if according to a building database, a particular building is 5 m tall, the building could either have two levels (2.5 m each) with a flat roof, or may be a single story house with a floor-to-ceiling separation of 3-3.5 m and an 1.5-2 m attic. However, if the building is located in a suburban area, such as San Jose, and neighboring homes are known to be single story, or if building codes mandate only single story homes, etc., then the 5 m height can be assumed to be roof maximum and not roof line. Conversely, if neighboring homes are known to have multiple levels, or if the building in question is known to be an apartment complex with units that imply multiple levels (i.e. Unit 101, Unit 201), then the 5 m height can be assumed to be roof line and hence a two level building.

To account for crawl spaces when modeling a physical building, in some embodiments an additional subterranean vertical separation is added near the bottom of the estimated floors. The additional subterranean vertical separation is typically no more than 1 m, for example, in order to model crawl spaces when constructing the estimated floor numbers. Such embodiments could be architecturally based, with details of a building's foundation used to infer the existence of a crawl space (e.g. a house on a concrete slab likely has no crawl space). Other embodiments could use building footprints to determine if an attic or crawl space is present in a building. Other embodiments may be market-based, with some markets like New Orleans likely not having subterranean features owing to flood risk. Some markets may be dominated by peaked rooftops (to protect against snow), and other markets may be dominated by flat rooftops, which can be used to infer if an attic is likely.

Each floor of a building model is associated with one or more altitude envelopes. An altitude envelope is a range of altitudes bounded by an altitude envelope minimum and an altitude envelope maximum and corresponds to the bounds on where a user of a mobile device could physically be located on each floor of a physical building, assuming they cannot be inside a floor or ceiling.

For a building model that is constructed using uniform floor-to-floor separation values, altitude envelope ranges can be defined as follows, assuming counting begins at floor number=1 and the ground aligns with the terrain (i.e., floor number 1 should have a minimum altitude envelope value of 0 m):

$$\text{Altitude Envelope Minimum=floor-to-floor separation} \times (\text{floor number}-1) \quad \text{(Equation 3)},$$

and $$\text{Altitude Envelope Maximum=(floor-to-floor separation} \times \text{floor number)}-(\text{boundary thickness}) \quad \text{(Equation 4)}.$$

For a building model that is constructed using non-uniform floor-to-floor separation values, altitude envelope ranges can be defined in general as follows, assuming counting begins at floor number=1:

$$\text{Altitude Envelope Minimum=} \Sigma_{i=1}^{\text{floor of interest-1}} \text{floor-to-floor separation}_i + \Sigma_{j=1}^{\text{floor of interest-1}} \text{boundary thickness}_j \quad \text{(Equation 5)},$$

and $$\text{Altitude Envelope Maximum=} \Sigma_{i=1}^{\text{floor of interest}} \text{floor-to-floor separation}_i + \Sigma_{j=1}^{\text{floor of interest-1}} \text{boundary thickness}_j \quad \text{(Equation 6)}.$$

In this convention, a "floor of interest" is the maximum floor number considered, and a given floor's boundary thickness is above the floor-to-ceiling separation.

For a building model that is constructed using uniform floor-to-floor separation values where the ground floor of the physical building does not align with the terrain (e.g., as shown for the building model 290b in FIG. 2), altitude envelope ranges can be defined as follows, assuming counting begins at floor number=1:

$$\text{Altitude Envelope Minimum=(floor-to-floor separation} \times (\text{floor number}-1)+(\text{boundary thickness'}) \quad \text{(Equation 7)},$$

and $$\text{Altitude Envelope Maximum=floor-to-floor separation} \times \text{floor number} \quad \text{(Equation 8)},$$

where boundary thickness' is a boundary thickness value above the terrain (e.g., boundary thickness value 206e shown in FIG. 2).

For a building model that is constructed using non-uniform floor-to-floor separation values where the ground floor of the physical building does not align with the terrain (e.g., as shown for the building model 290b in FIG. 2), altitude envelope ranges can be defined as follows, assuming counting begins at floor number=1:

$$\text{Altitude Envelope Minimum=} \Sigma_{i=1}^{\text{floor of interest-1}} \text{floor-to floor separation}_i + \Sigma_{j=1}^{\text{floor of interest-1}} \text{boundary thickness}_j + \text{boundary thickness'} \quad \text{(Equation 9)},$$

and $$\text{Altitude Envelope Maximum=} \Sigma_{i=1}^{\text{floor of interest}} \text{floor-to floor separation}_i + \Sigma_{j=1}^{\text{floor of interest-1}} \text{boundary thickness}_j + \text{boundary thickness'} \quad \text{(Equation 10)}.$$

In this convention, a "floor of interest" is the maximum floor number considered, a given floor's boundary thickness is above the floor-to-ceiling separation, and the boundary thickness' is a boundary thickness value above the terrain (e.g., boundary thickness value 206e in FIG. 2).

An example table 300 of altitude envelope ranges determined for each floor of a four-story building model is shown in FIG. 3, in accordance with some embodiments. The values of the table 300 were generated assuming a uniform 0.3 m boundary thickness for the building model and a uniform 3 m floor-to-floor separation using equation 3 and equation 4, where the floor-to-floor separation is equal to the 0.3 m boundary thickness plus a 2.7 m floor-to-ceiling separation and the ground of the lowest non-subterranean floor is aligned with a top surface of the terrain. In practice, because floor separations may not be a constant value within a building, nor may they be common values across different buildings, in some embodiments it is assumed that there is a variety of possible floor-to-floor separation values which may be combined to compute an aggregate altitude envelope distribution. The aggregate altitude envelope distribution is a series of altitude ranges ("altitude envelopes"), where each altitude range corresponds to altitudes associated with a particular floor of a physical building. Such a "distribution" in this sense is a representation of how altitude envelopes correspond to sequential floor numbers of a building.

Owing to the additive nature of floor-to-floor separation values, higher floors within a building model will have a wider range of possible altitude values as compared to the lower floors. An example table 400 shown in FIG. 4 shows two distributions, "Distribution 1", and "Distribution 2" of altitude envelope ranges determined computationally for a four-story building model, in accordance with some embodiments. Altitude envelope minimum and altitude envelope maximum values of Distribution 1 in the table 400 were calculated using equation 3 and equation 4 using a uniform floor-to-ceiling separation value of 2.2 m and a boundary thickness of 0.3 m (i.e., a floor-to-floor separation value of 2.5 m). Values of Distribution 2 were calculated using equation 3 and equation 4 using a uniform floor-to-ceiling separation value of 2.7 m and a boundary thickness of 0.3 m (i.e., a floor-to-floor separation value of 3 m).

Though only two distributions of altitude envelopes for a building model are shown in the table 400, in some embodiments altitude envelope distributions are created for a wide range of floor-to-floor separation values. For example, a set of altitude envelope distributions may be created by generating an altitude envelope distribution for each floor-to-floor separation value beginning with a minimum expected floor-to-ceiling separation value, such as 2.5 m, and incrementing the floor-to-floor separation value by a uniform value, such as 0.1 m, until a maximum expected floor-to-floor separation value, such as 4.5 m, is reached. The floor-to-floor separation value may be incremented by a uniform value, as described, or by a non-uniform value. For example, in some embodiments, the floor-to-floor separation value may be log-spaced, have repeated separations, or may be weighted on particular separation values. For example, instead of incrementing floor-to-floor separation values by a uniform value of 0.1 m until 4.5 m is reached, e.g., 2.5 m, 2.6 m, 2.7 m 4.5 m, in some embodiments the floor-to-floor separation values are incremented at an increasing rate, e.g., 2.5 m, 2.6 m, 2.8 m, 3.5 m, . . . 4.5 m. Or, in some embodiments the floor-to-floor separation value remain fixed for multiple distributions to provide a greater weight to that separation value in the aggregate altitude envelope distribution, e.g., 2.5 m, 2.5 m, 2.5 m, . . . 4.5 m. In some embodiments, as described below, the set of altitude envelope distributions is then filtered to remove altitude envelope distributions that result in non-physical (e.g., physically impossible, improbably, or impractical) floors or building models. In some embodiments, distributions that are filtered from the set of altitude envelope distributions do not contribute to an aggregate altitude envelope distribution. In other embodiments, distributions that are filtered from the set of altitude envelope distributions do not fully contribute to an aggregate altitude envelope distribution (e.g., their contribution is weighted such that they contribute less to the aggregate altitude envelope distribution as compared to distributions that were not filtered from the set of altitude envelope distributions). Any remaining altitude envelope distributions are then combined to create an aggregate altitude envelope distribution.

In some embodiments, the aggregate altitude envelope distribution is created for a building model by determining an aggregate altitude envelope minimum and an aggregate altitude maximum for each floor of the building model.

In other embodiments, each of the altitude envelopes (i.e. Distribution 1, Distribution 2, etc.) is determined as a probability distribution function (uniform, Gaussian/normal, or some other distribution), and when combined into an aggregate altitude envelope distribution, the aggregate altitude envelope distribution may resemble a probability distribution with a peak that corresponds to the peak of the combination of the weighted altitude envelopes. For example, with reference to FIG. 6 described below, if a 2.2 m floor-to-ceiling separation value of a first altitude envelope distribution 602 is weighted more than a 2.7 m floor-to-ceiling separation value of a second altitude envelope distribution, then an aggregate altitude envelope distribution 606 may have floor distributions that are weighted more toward the lower end (i.e., the Floor 1 range from 606 is concentrated more from 0-2.2 m than from 2.2-2.7 m).

In yet other embodiments, the aggregate altitude minimum for a floor is the smallest altitude envelope minimum value of altitude envelopes associated with that floor for each of the altitude envelope distributions. Similarly, the aggregate altitude maximum for a floor is the largest altitude envelope maximum value of altitude envelopes associated with that floor for each of the altitude envelope distributions.

An example aggregate altitude envelope distribution constructed according to this embodiment is shown in a floor number lookup table 500 of FIG. 5. As shown, in some embodiments, the aggregate altitude envelope minimum value for each floor is the minimum altitude envelope value from Distribution 1 or Distribution 2 for that floor as shown in table 400 of FIG. 4. Similarly, the aggregate altitude envelope maximum value for each floor is the maximum altitude envelope value from Distribution 1 or Distribution 2 for that floor as shown in table 400 of FIG. 4. In other embodiments, the aggregate altitude minimum is within a percentage (e.g., 10%) of the altitude envelope minimum value of altitude envelopes associated with that floor number for each of the altitude envelope distributions. Similarly, in such embodiments, the aggregate altitude maximum is within a percentage (e.g., 10%) of the largest altitude envelope maximum value of altitude envelopes associated with that floor number for each of the altitude envelope distributions. In yet other embodiments, each of the altitude envelopes is determined as a probability distribution function. Such probability distribution functions can be concentrated (peaked) where there is significant overlap across altitude envelope distributions corresponding to different floor-to-floor separation values, and the aggregate altitude envelope distribution can be concentrated in regions where there are multiple altitude envelope distributions overlapping. For example, in FIG. 4, the aggregate altitude envelope distribution can be combined from Distribution 1 and Distribution 2, where the aggregate altitude envelope distribution can be concentrated between 9 m and 9.7 m, and less concentrated between 7.5 m and 9 m, and less concentrated between 9.7 m and 11.7 m.

Figure 6:
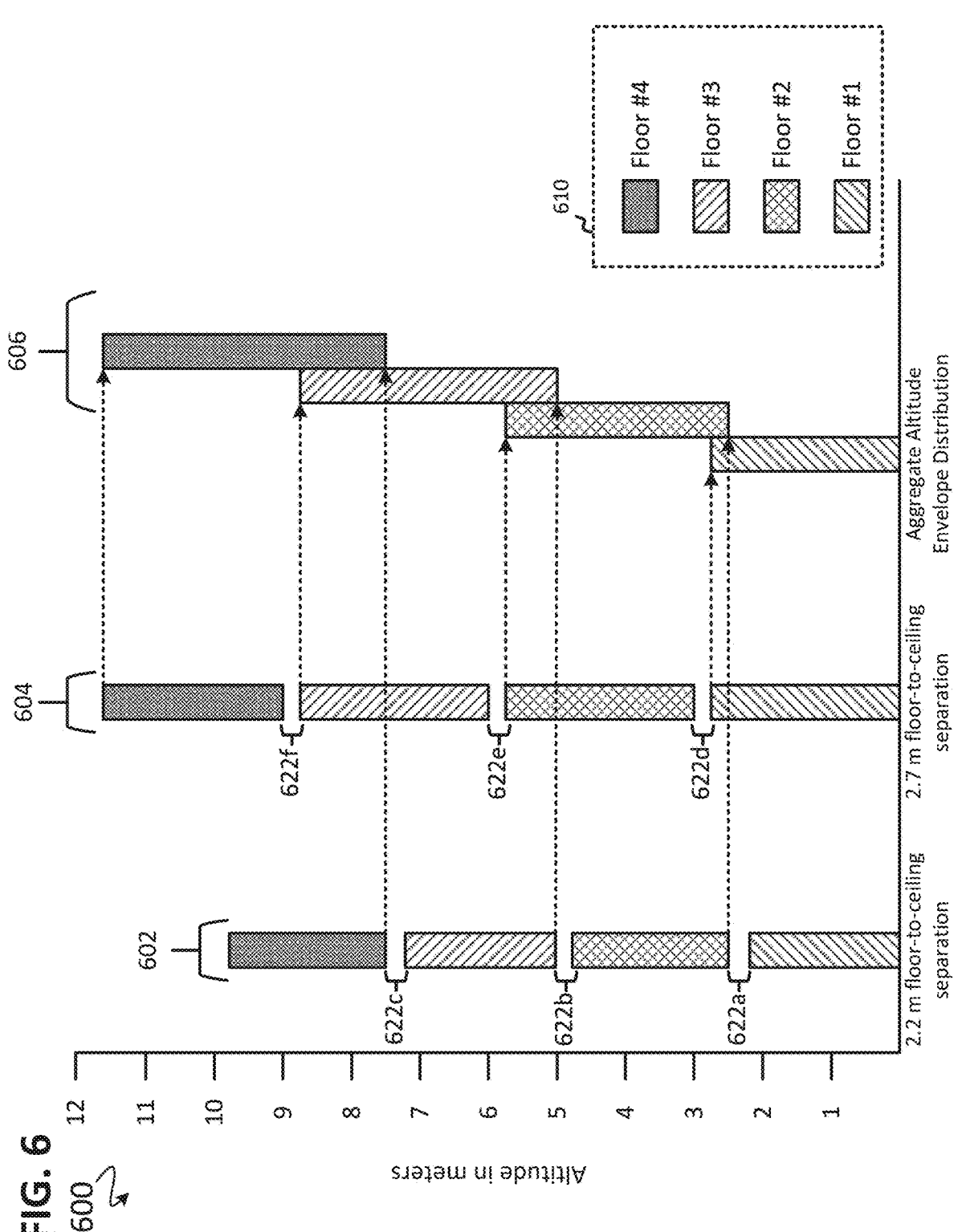
FIGS. 6-13 show graphical representations of example aggregate altitude envelope distributions, in accordance with some embodiments.

An example graphical representation 600 of the altitude envelope distribution values of table 400 and the resulting aggregate altitude envelope distribution values of the floor number lookup table 500 is shown in FIG. 6, in accordance with some embodiments. The graph 600 includes a first altitude envelope distribution 602, a second altitude envelope distribution 604, boundary thicknesses 622a-f, an aggregate altitude envelope distribution 606, and a legend 610 of floor numbers that includes altitude envelope ranges for floors 1-4, each floor being designated by a unique fill pattern. The altitude envelope ranges for each floor of the first distribution 602 correspond to the values for Distribution 1 shown in table 400 of FIG. 4. Similarly, the altitude envelope ranges for each floor of the second distribution 604 correspond to the values for Distribution 2 shown in table 400 of FIG. 4. The boundary thicknesses 622a-f are set to a fixed value of 0.3 m. As shown by the dashed lines, minimum altitude envelope values and maximum altitude envelope values from the first altitude envelope distribution 602 and the second altitude envelope distribution 604 are selected to create the aggregate altitude envelope distribution 606.

As disclosed herein, values of the aggregate altitude envelope distribution 606 are stored as a floor number lookup table for later retrieval. For example, upon estimating which physical building a mobile device is in, an aggregate altitude envelope distribution, i.e., a floor number lookup table, associated with that physical building may be retrieved. In some embodiments, if there is uncertainty as to which physical building the mobile device is in, multiple aggregate altitude envelope distributions may be retrieved, each of the distributions corresponding to a physical building that the mobile device is likely to be in. Then, the retrieved aggregate altitude envelope distribution(s) can be used to map an estimated altitude of the mobile device to a floor number and/or floor label for each of the physical building(s).

For example, based on the values of the floor number lookup table 500 shown in FIG. 5, an estimated altitude of 7 m could be translated, or "mapped" to floor number 3. Since there can be overlapping altitude envelopes regions, multiple floor numbers could also be selected. For example, an altitude of 8 m could indicate floor number 3 OR floor number 4, OR floor number 3 (with an indicated 75% likelihood) OR floor number 4 (with an indicated 25% likelihood), with the percentages reflecting the confidence of the result. In some embodiments, the confidence of each result is derived as the distance to the floor number centroid. Further descriptions of determining and summarizing estimated floor numbers and their associated confidences are described below.

In some embodiments, floor numbers are precomputed (as detailed below) along with their respective ranges once and then used to populate a database for subsequent lookup going forward, the values only being recalculated if the constraints change (buildings are further constructed or demolished, database errors are determined and/or rectified, etc.).

Figure 7:
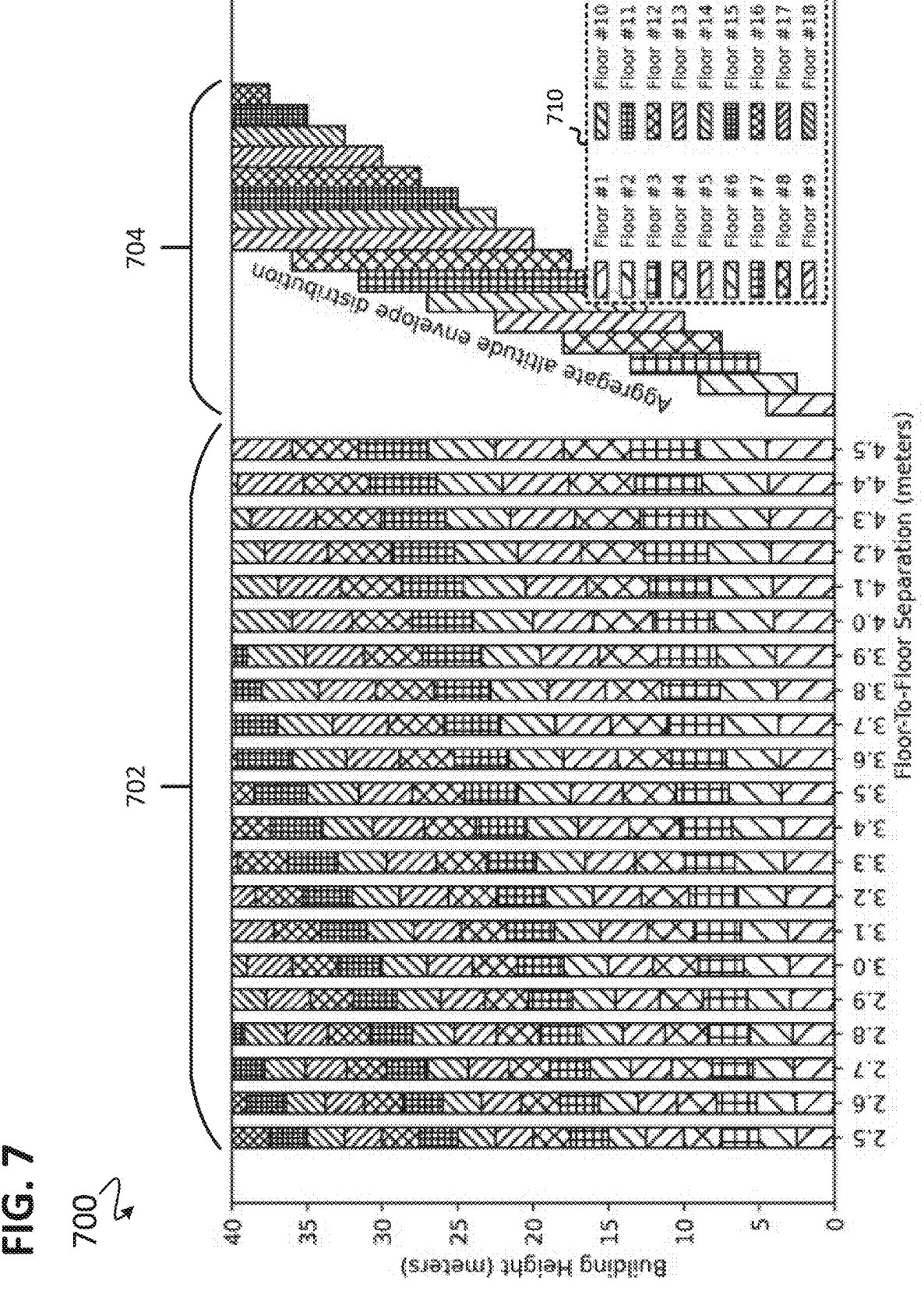

Another example of an aggregate altitude envelope distribution constructed using a set of altitude envelope distributions is shown in FIG. 7, in accordance with some embodiments. In this example, a small boundary thickness has been assumed. Basement floors/levels are not illustrated, but the same approaches disclosed herein are applicable for buildings having single or multiple levels below ground level. FIG. 7 includes a graph 700 that shows a set of altitude envelope distributions 702, an aggregate altitude envelope distribution 704 that was generated using the altitude envelope distributions 702, and a legend 710 of floor numbers.

In the example shown, the altitude envelope distributions 702 include individual altitude envelope distributions that each correspond to a different floor-to-floor separation value ranging from 2.5 m to 4.5 m. In this example, no altitude envelope distribution constraints, described in detail below, have been applied to the altitude envelope distributions 702. As a result, the higher floors of the aggregate altitude envelope distribution 704 have an increasingly wider altitude envelope range as compared to the lower floors. For example, floor number 7 ("floor #7") of the aggregated altitude envelope distribution 704 spans from about 17 to 32 meters. Such a wide span makes it unlikely that using values from the aggregate altitude envelope distribution 704 as a floor number lookup table to generate an estimated floor number using an estimated altitude will result in an accurate or useful result.

In some instances, specific factual information about a physical building is available (e.g., from a data source such as a building database). Such information may include the actual number of floors in that building, the actual height of that building, and so on. However, in many instances, only general, regional, information is available (e.g., a maximum building height for a region, a maximum number of floors for a region, etc.). Without any information about a physical building, it may be assumed that the floor number 1, as defined herein, is on the ground, meaning that the Altitude Envelope Min of floor number 1 has a 0 m height-above-terrain value, possibly including any boundary thickness. However, depending on a building morphology or a building type, some reasonable constraints may be assumed and used to generate a more accurate mapping between an estimated altitude of a mobile device and an estimated building floor number as compared to if no constraints were assumed. Such altitude envelope distribution constraints include a minimum building height, a maximum building height, a minimum floor height, a maximum floor height, a minimum number of floors, and a maximum number of floors. By using such constraints, tighter altitude envelope distributions may be advantageously determined when modeling a physical building.

Depending on which altitude envelope distribution constraints are selected, four different aggregate distributions may be determined, each with varying quality. These distributions may be determined considering: 1) using no constraints, 2) constraining the number of stories (which may or may not include the number of basement stories), 3) constraining the building height (which may or may not include the depth of the building into the ground), and 4) using both of the preceding constraints. After a set of altitude envelope distribution constraints, if any, are selected, the selected constraints are optionally used when generating the altitude envelope distributions and/or are optionally used to filter out any altitude envelope distributions that violate one or more of the constraints. In addition to such altitude envelope distribution constraints, boundary thicknesses can be estimated or can be based on measured data.

Figure 8:
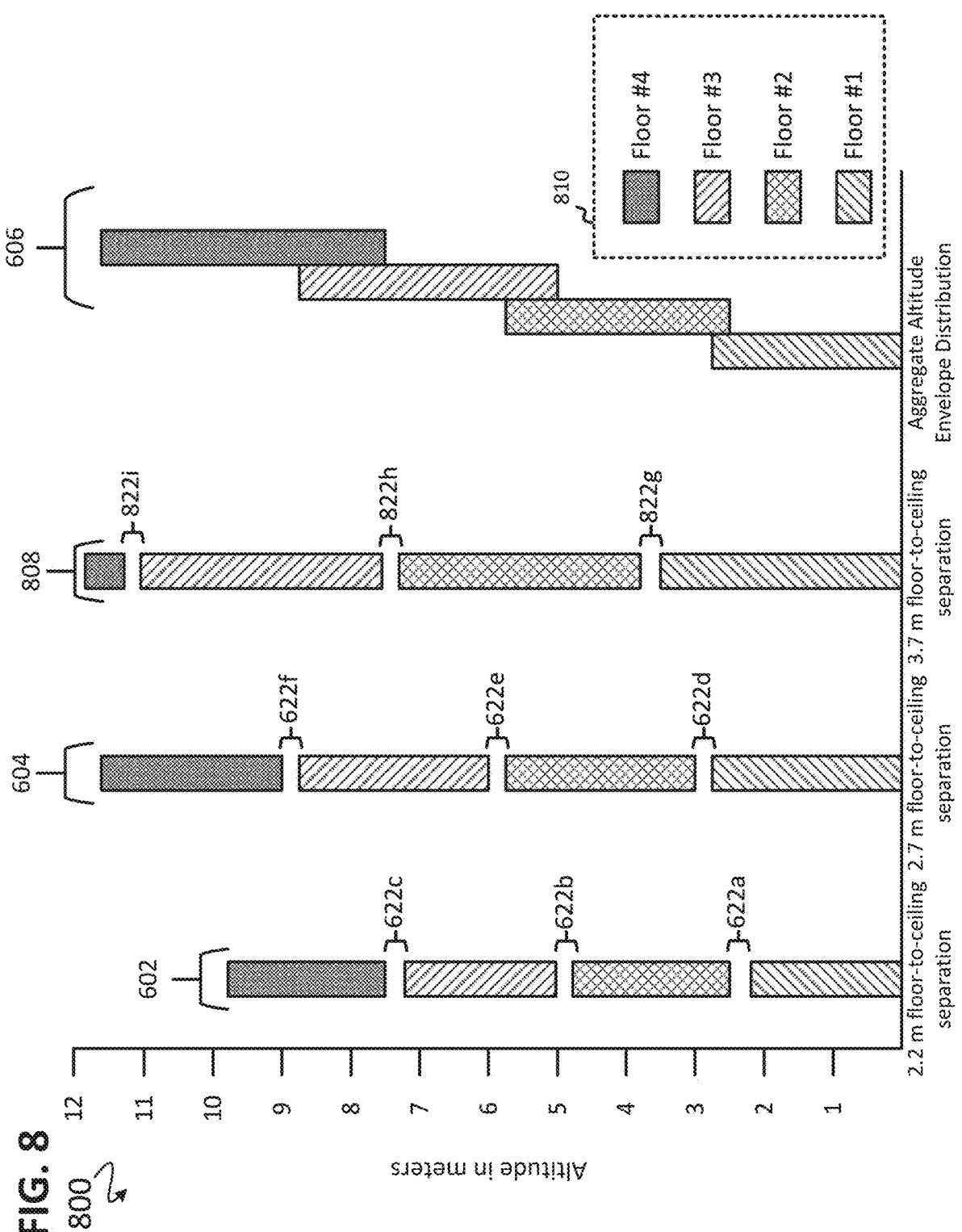

For example, as shown in FIG. 8, an altitude envelope distribution constraint on the number of stories in a building may be used when generating the altitude envelope distributions and an altitude envelope distribution constraint on a maximum building height may also be applied to the altitude envelope distributions after they have been generated. FIG. 8 shows a simplified graphical representation 800 of altitude envelope distribution values and the resulting aggregate altitude envelope distribution values, in accordance with some embodiments. The graph 800 includes the first altitude envelope distribution 602 from FIG. 6, the second altitude envelope distribution 604, the boundary thicknesses 622*a-f*, a third altitude envelope distribution 808, boundary thicknesses 822*g-i*, the aggregate altitude envelope distribution 606, and a legend 810 of floor numbers. The third altitude envelope distribution 808 was generated using 4 m floor-to-floor separation values, and the boundary thicknesses 622*a-f* and 822*g-i* are set to a fixed value of 0.3 m. Basement floors/levels are not illustrated, but the same approaches disclosed herein are applicable for buildings having single or multiple levels below ground level.

As mentioned above, an altitude envelope distribution may be constrained by a minimum or maximum number of floors in a building. The maximum number of floors may be based on general information for the region that the physical building is located in. In some embodiments, the process for determining altitude envelopes for each floor of a building is halted when the maximum number of floors is reached. In the example shown, an altitude envelope distribution constraint on the number of floors in the building (i.e., four) was used when generating the distributions 602, 604, and 808, and an altitude envelope distribution constraint on maximum building height (i.e., 12 m) was applied after the distributions 602, 604, and 808 were generated. As a result of these constraints, the third altitude envelope distribution 808 has a non-physical floor (i.e., floor number 4). Floor number 4 of the third altitude envelope distribution 808 is considered to be non-physical because it has an altitude envelope that is only a little more than half a meter high and is, therefore, an improbable floor configuration for a building. Because the distribution 808 has a non-physical floor, altitude values from that distribution were advantageously excluded when the aggregate altitude envelope distribution 606 was determined. If the building height constraint had not been applied to the distributions 602, 604, and 808, the third altitude envelope distribution 808 would have also contributed to the aggregate altitude envelope distribution 606.

In some embodiments selecting altitude envelope distribution constraints includes a sub-step of validating a set of initially selected constraints. The set of initially selected altitude envelope distribution constraints may be validated before being used when generating the altitude envelope distributions and/or before applying the constraints to the generated altitude envelope distributions.

For example, it may be determined if a given building height constraint is valid given the morphology of the region (e.g., suburban, where no building exceeds a threshold, such as 20 m), or given a maximum building height for the region (e.g., no building in Chicago is taller than a region's tallest building, such as the Willis Tower in Chicago). In another example, it may be determined if a constraint on the number of building stories is valid given a morphology of the region (e.g., suburban, where no building exceeds 5 stories, for example), or given a maximum number of building stories for the region (e.g., no building has more stories than the building in the region with the most stories).

In addition to validating individual altitude envelope distribution constraints of the initial set of constraints, combinations of altitude envelope distribution constraints may also be validated. For example, some combinations of constraints may result in non-physical building models when a particular floor-to-floor separation value and/or floor-to-ceiling separation value is assumed. For example, if an absolute minimum floor-to-floor separation value of 2 m is assumed (which is reasonable, assuming an upper bound of people's heights), then a combination of a first altitude envelope distribution constraint requiring that the building have eight stories and a second altitude envelope distribution constraint requiring a 10 m building height would result in a non-physical building model because each story would only be 1.25 m tall. In another example, if a maximum floor-to-floor separation of 5 m is assumed, then a 100 m building with 10 stories would be non-physical because each resulting story is only half as high as suggested by the building height.

Several options for handling individual or combinations of altitude envelope distribution constraints for a particular building that do not pass validation ("non-physical constraints") are disclosed herein. Each of such options can be performed together or separately and include:

i) Removing the building height constraint. This may be performed if the building height constraint is determined to be erroneous or improbable for the region that the building is in (e.g., a suburban house that is 100 m tall is improbable, a skyscraper height that exceeds the tallest skyscraper in the world is improbable, etc.);

ii) Removing the maximum floor number constraint. This may be used if the constraint on the number of stories of the building is determined to be erroneous or improbable for the region that the building is in (e.g., a suburban house with 10 stories is improbable, a skyscraper with more than 400 stories is improbable);

iii) Removing both the floor number and building height constraints. This may be used if both the constraints on the number of stories and the building height are determined to be erroneous or improbable for the region that the building is in;

iv) Flagging the building for offline verification and warning the user. Offline human verification has the advantage of further strengthening and validating a building dataset; and/or v) Warning the user and/or doing nothing. This has the advantage of using minimal resources.

Figure 9:
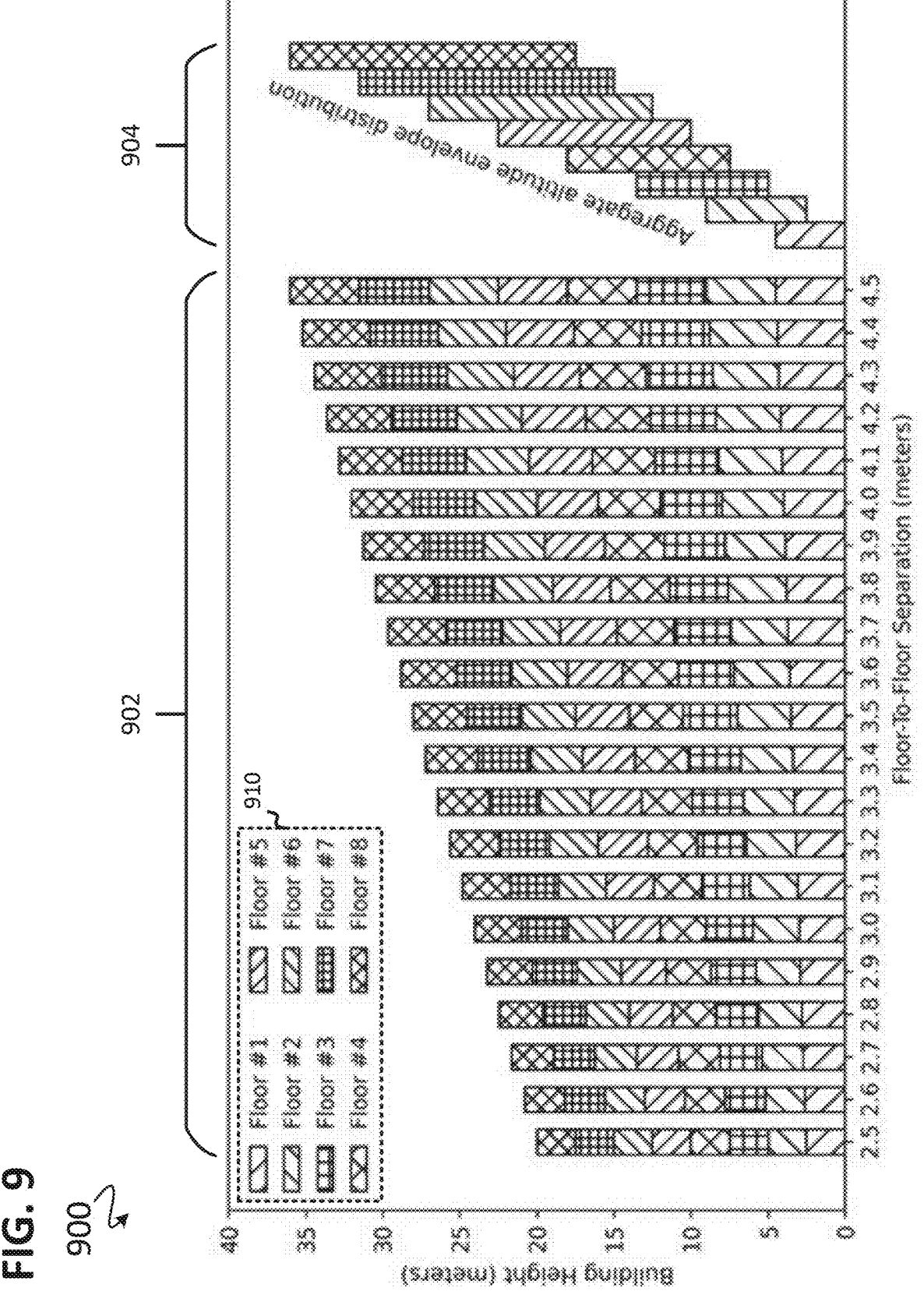

As an example of either option (i) above, or of a situation where only one altitude envelope distribution constraint was initially selected, FIG. 9 shows an example of aggregate altitude envelope distribution constructed using just a constraint on a maximum number of floors in the building (e.g., because the building height constraint was removed or because a building height constraint is unavailable), in accordance with some embodiments. In this example, a small boundary thickness has been assumed and the lowest altitude of the altitude envelope for floor number 1 is aligned with a building height of 0 m (i.e., the floors are stacked from the bottom up). FIG. 9 includes a graph 900 that shows a set of altitude envelope distributions 902, an aggregate altitude envelope distribution 904 that was generated using the altitude envelope distributions 902, and a legend 910 of floor numbers. Basement floors/levels are not illustrated, but the same approaches disclosed herein are applicable for buildings having single or multiple levels below ground level.

In the example shown, the altitude envelope distributions 902 include individual altitude envelope distributions that each correspond to a different floor-to-floor separation value ranging from 2.5 m to 4.5 m. The distributions 902 were constructed given a constraint that the building being modeled has a maximum of eight floors.

Figure 10:
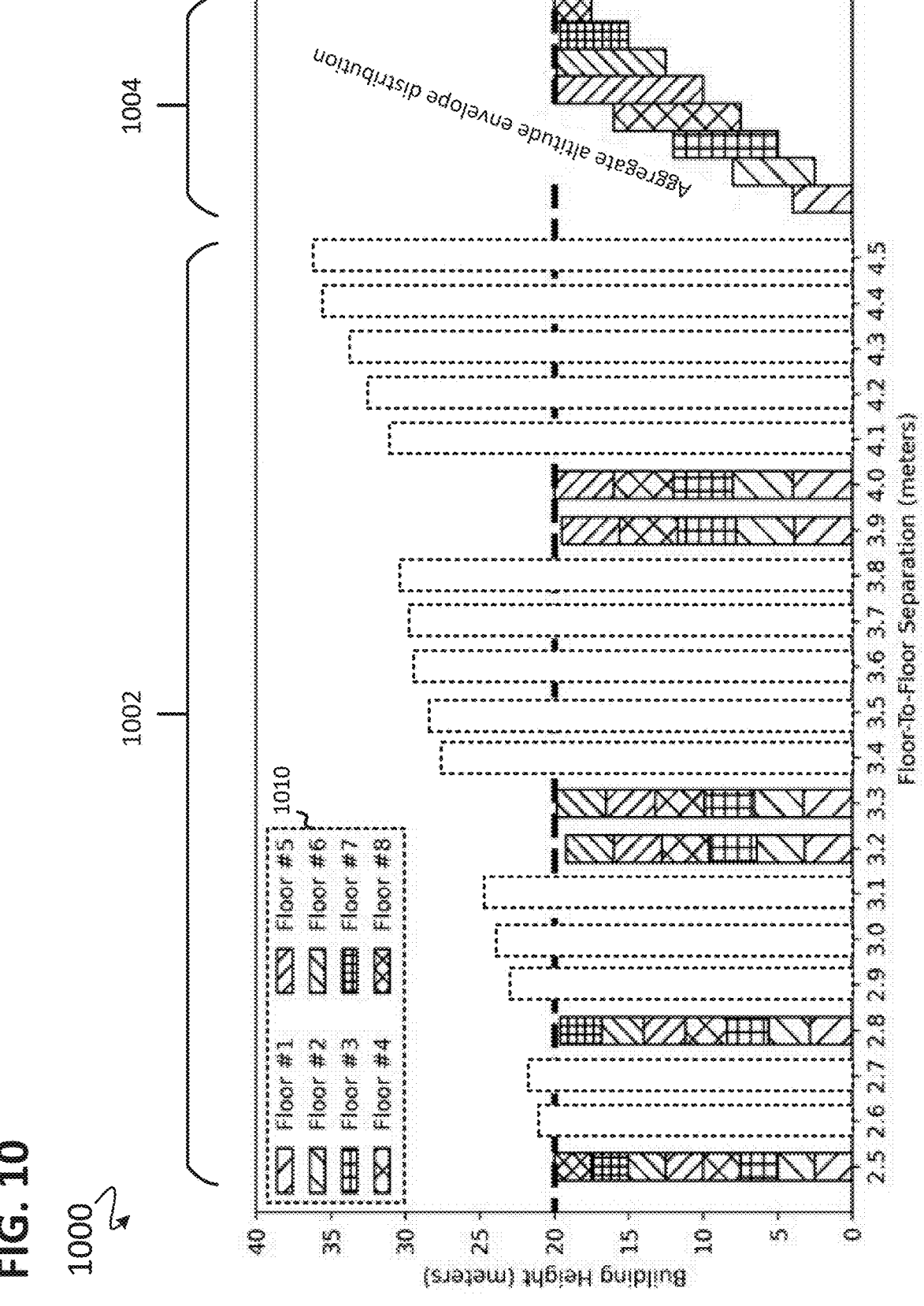

As an example of either option (ii) above, or of a situation where only one altitude envelope distribution constraint was initially selected, FIG. 10 shows an example of aggregate altitude envelope distribution constructed using just a constraint on a maximum building height (e.g., because the maximum number of floors constraint was removed or because the maximum number of floors is not available), in accordance with some embodiments. Similar to the example shown in FIG. 9, in this example, a small boundary thickness has been assumed and the lowest altitude of the altitude envelope for floor number 1 is aligned with a building height of 0 m (i.e., the floors are stacked from the bottom up). FIG. 10 includes a graph 1000 that shows a set of altitude envelope distributions 1002, an aggregate altitude envelope distribution 1004 that was generated using the altitude envelope distributions 1002, and a legend 1010 of floor numbers. Basement floors/levels are not illustrated, but the same approaches disclosed herein are applicable for buildings having single or multiple levels below ground level.

The distributions 1002 were initially constructed without a constraint on a maximum number of floors and each distribution corresponds to a different floor-to-floor separation value ranging from 2.5 m to 4.5 m. However, after a constraint on a maximum building height of 20 m was applied, a subset of the distributions 1002, illustrated as rectangles with dashed lines, were filtered from the set of distributions 1002 because they resulted in non-physical floors (not shown) at the top of the building. For example, a topmost floor of a building having a floor-to-ceiling separation that was less than 2.5 m is a non-physical floor. As such, the subset of the distributions 1002 that are represented by dashed lines were not used to generate the aggregate altitude envelope distribution 1004.

Figure 11:
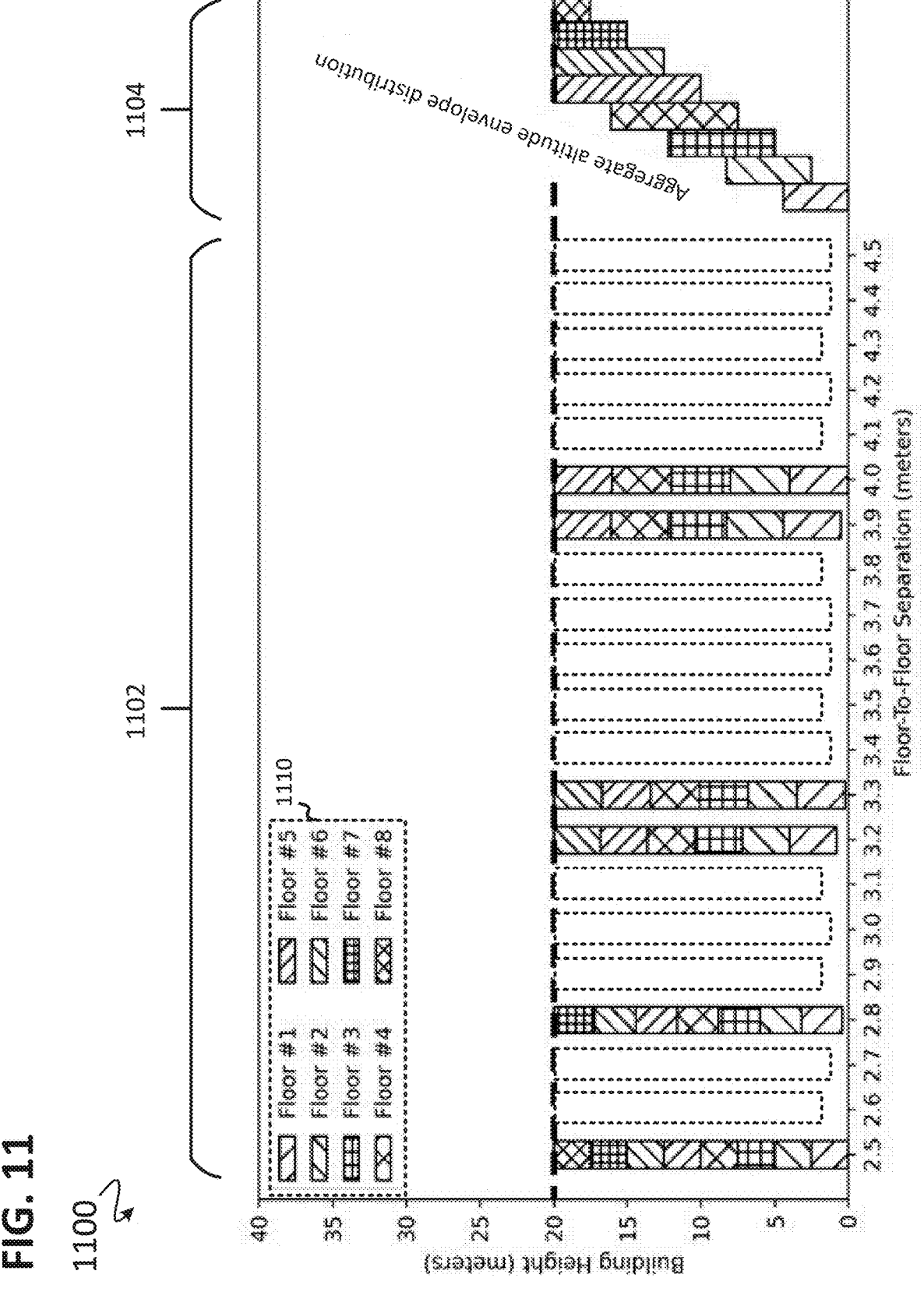

As an alternative to computationally stacking floors from the bottom up, floors may be computationally stacked from the building rooftop down. In such embodiments, distributions having floor separations that yield non-physical floors at the bottom of the building (e.g., floor-to-floor separations less than 2.5 m for bottom floors) may be removed, as shown in FIG. 11, in accordance with some embodiments. In some embodiments, for buildings with basement levels, distributions that are computationally stacked from the building rooftop down could extend into the ground and not be removed based on the non-physical constraint.

Similar to that shown in FIG. 10, in this example, a small boundary thickness has been assumed. However, in FIG. 11, the highest altitude of the altitude envelope for floor number 8 is aligned with a building height of 20 m (i.e., the floors are computationally stacked from the top-down). FIG. 11 includes a graph 1100 that shows a set of altitude envelope distributions 1102, an aggregate altitude envelope distribution 1104 that was generated using the altitude envelope distributions 1102, and a legend 1110 of floor numbers. Basement floors/levels are not illustrated, but the same approaches disclosed herein are applicable for buildings having single or multiple levels below ground level.

The distributions 1102 were initially constructed without a constraint on a maximum number of floors and each corresponds to a different floor-to-floor separation value ranging from 2.5 m to 4.5 m. However, after a constraint on a maximum building height of 20 m was applied, a subset of the distributions 1102, illustrated as rectangles with dashed lines, were filtered from the set of distributions 1102 because they resulted in non-physical floors (not shown) at the bottom of the building (e.g., a bottommost floor had a floor-to-ceiling separation that was less than 2.5 m). As such, the subset of the distributions 1102 that are represented by dashed lines were not used to generate the aggregate altitude envelope distribution 1104.

Figure 12:
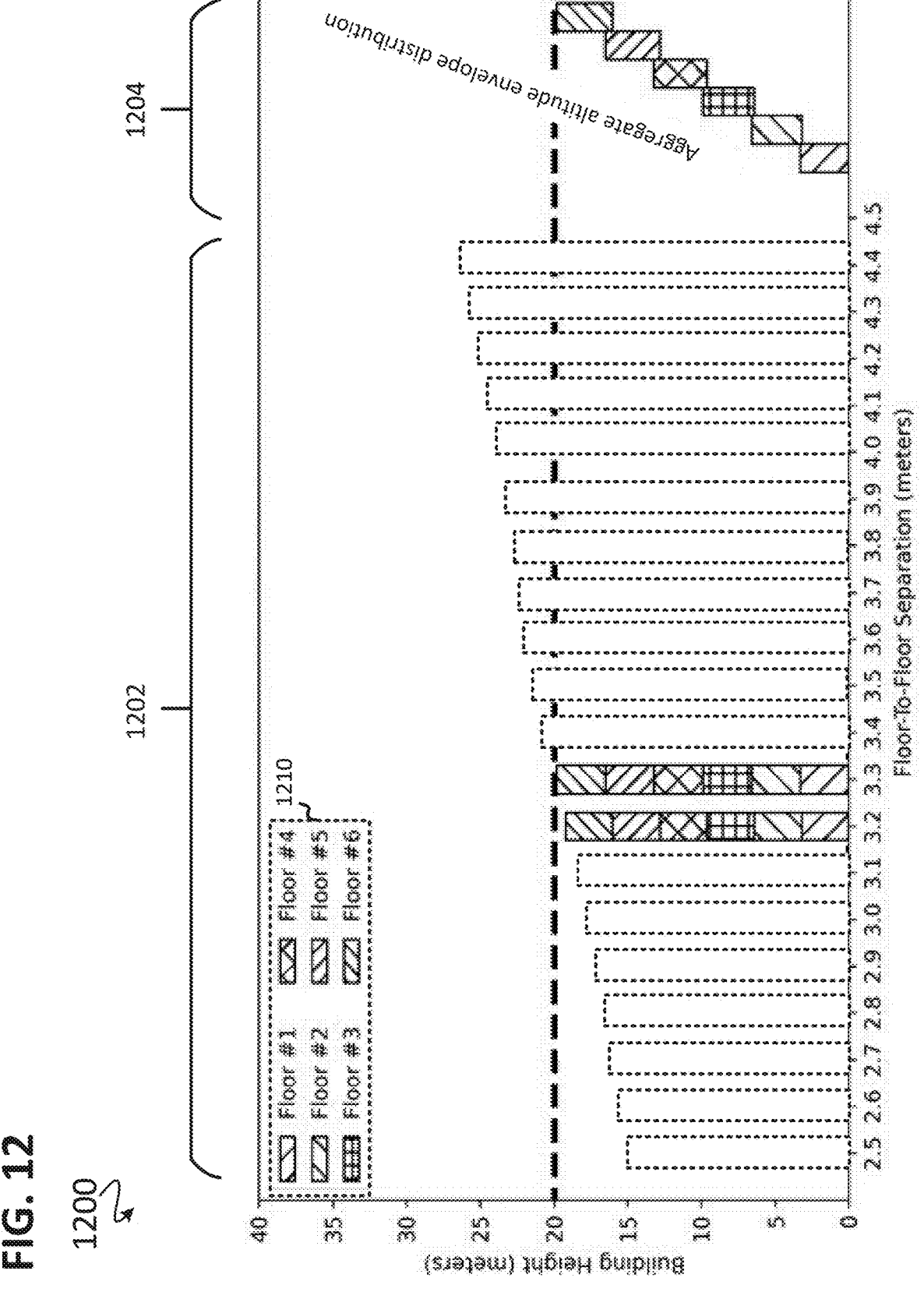

As mentioned above, in some embodiments, two altitude envelope distribution constraints may be combined to reduce the number of possible altitude envelope distributions even more than the individual constraints. An example of an aggregate altitude envelope distribution constructed using a set of altitude envelope distributions when a maximum floor number constraint and a maximum building height constraint are applied is shown in FIG. 12, in accordance with some embodiments. Similar to that shown in FIG. 10, in this example, a small boundary thickness has been assumed and the lowest altitude of the altitude envelope for floor number 1 is aligned with a building height of 0 m (i.e., the floors are computationally stacked from the bottom up). FIG. 12 includes a graph 1200 that shows a set of altitude envelope distributions 1202, an aggregate altitude envelope distribution 1204 that was generated using the altitude envelope distributions 1202, and a legend 1210 of floor numbers. Basement floors/levels are not illustrated, but the same approaches disclosed herein are applicable for buildings having single or multiple levels below ground level.

The distributions 1202 were initially constructed using a constraint on a maximum number of floors (i.e., a maximum of 6 floors) and each distribution corresponds to a different floor-to-floor separation value ranging from 2.5 m to 4.5 m. However, after a constraint on a maximum building height of 20 m was applied, a subset of the distributions 1202, illustrated as rectangles with dashed lines, were filtered from the set of distributions 1202 because they resulted in non-physical floors (not shown) at the top of the building (e.g., a topmost floor had a floor-to-ceiling separation that was less than 2.5 m). As such, the subset of the distributions 1202 that are represented by dashed lines were not used to generate the aggregate altitude envelope distribution 1204. As shown, the combination of two altitude envelope distribution constraints (maximum floor number and maximum building height) advantageously results in much less overlap between the altitude envelopes of the aggregate altitude envelope distribution 1204 as compared to the aggregate altitude envelope distribution 1104 of FIG. 11, the aggregate altitude envelope distribution 1004 of FIG. 10, and especially the aggregate altitude envelope distribution 904 of FIG. 9. As such, a building floor number lookup table that uses the aggregate altitude envelope distribution 1204 will be more accurate than a building floor lookup table that uses the aggregate altitude envelope distributions 1104, 1004, or 904. Additionally, a building floor number lookup table that uses the aggregate altitude envelope distribution 1204 may be advantageously generated without a costly survey of the associated physical building while still providing accurate estimated floor numbers for that building based on a user's estimated altitude.

Figure 13:
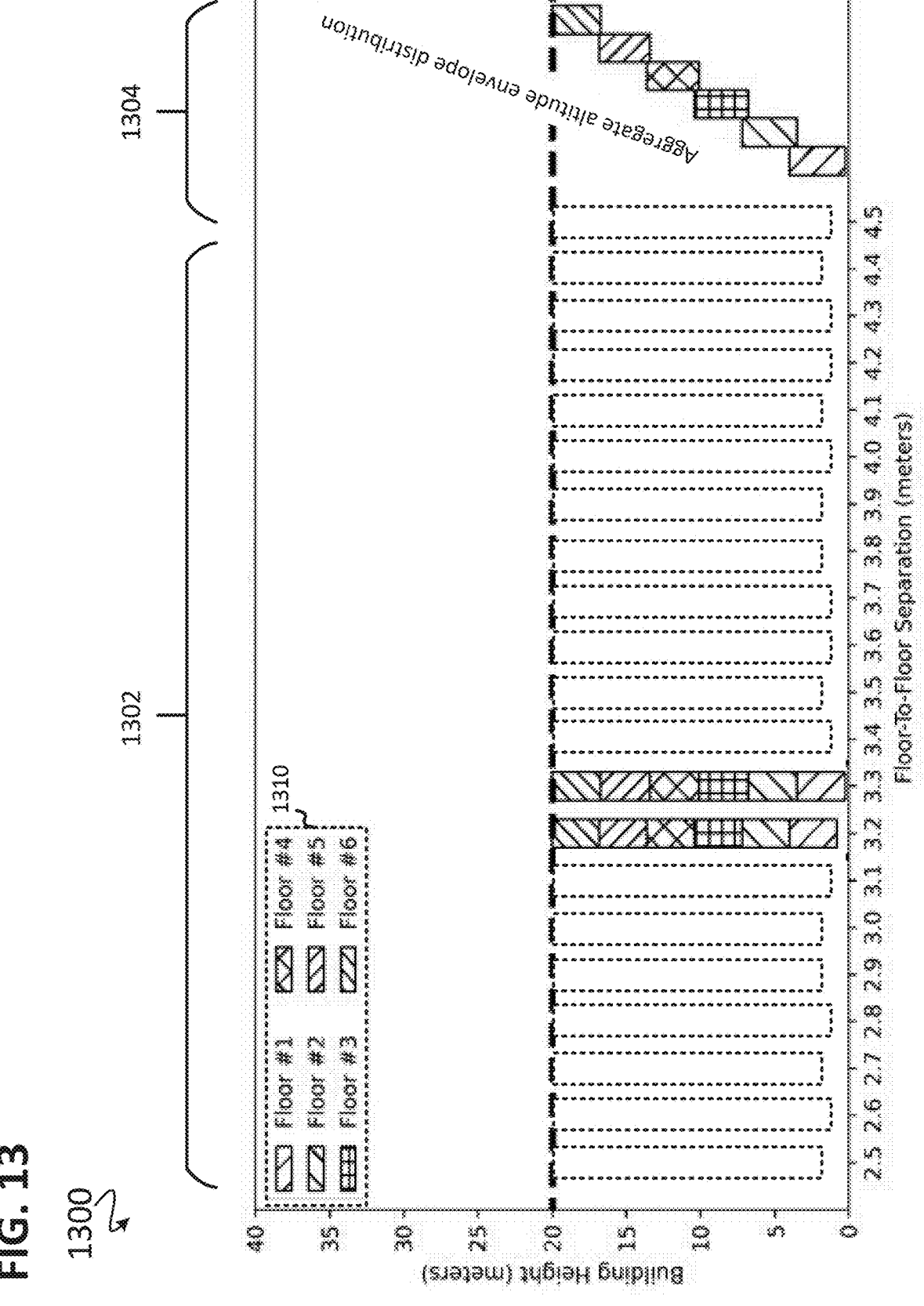

As was discussed above, alternatively to computationally stacking floors from the bottom up, floors may be computationally stacked from the building rooftop down and floor separations that yield non-physical floors at the bottom of the building (e.g., floor-to-floor separations less than 2.5 m for bottom floors) may be removed. An example of an aggregate altitude envelope distribution constructed using a set of altitude envelope distributions when a maximum floor number constraint and a maximum building height constraint are applied is shown in FIG. 13, in accordance with some embodiments. Similar to that shown in FIG. 11, in this example, a small boundary thickness has been assumed and the largest altitude of the altitude envelope for floor number 6 is aligned with a maximum building height of 20 m (i.e., the floors are stacked from the top-down). FIG. 13 includes a graph 1300 that shows a set of altitude envelope distributions 1302, an aggregate altitude envelope distribution 1304 that was generated using the altitude envelope distributions 1302, and a legend 1310 of floor numbers. Basement floors/ levels are not illustrated, but the same approaches disclosed herein are applicable for buildings having single or multiple levels below ground level.

The distributions 1302 were initially constructed using a constraint on a maximum number of floors (i.e., a maximum of 6 floors) and each distribution corresponds to a different floor-to-floor separation value ranging from 2.5 m to 4.5 m. However, after a constraint on a maximum building height of 20 m was applied, a subset of the distributions 1302, illustrated as rectangles with dashed lines, were filtered from the set of distributions 1302 because they resulted in non-physical floors (not shown) at the bottom of the building (e.g., a bottommost floor had a floor-to-ceiling separation that was less than 2.5 m). As such, the subset of the distributions 1302 that are represented by dashed lines were not used to generate the aggregate altitude envelope distribution 1304. As shown, the combination of two altitude envelope distribution constraints (maximum floor number and maximum building height) advantageously results in much less overlap between the altitude envelopes of the aggregate altitude envelope distribution 1304 as compared to the aggregate altitude envelope distribution 1104 of FIG. 11, the aggregate altitude envelope distribution 1004 of FIG. 10, and especially the aggregate altitude envelope distribution 904 of FIG. 9. As such, a building floor number lookup table that uses the aggregate altitude envelope distribution 1304 will be more accurate than a building floor lookup table that uses the aggregate altitude envelope distributions 1104, 1004, or 904.

In some embodiments, the aggregate altitude envelope distribution may include a combination of altitude envelope distributions that were generated using different techniques. For example, a bottom portion of an aggregate altitude envelope distribution may include altitude envelope distributions that were formed from the bottom up (e.g., as shown and described with reference to FIG. 12), and a top portion of the aggregate altitude envelope distribution may include altitude envelope distributions that were formed from the top down (e.g., as shown and described with reference to FIG. 13) to further decrease altitude envelope overlap. For example, a top half of an aggregate envelope distribution may include the top half of the aggregate envelope distribution 1304 corresponding to floor numbers 4-6, and a bottom half of the altitude envelope distribution may include the bottom half of the aggregate altitude distribution 1204 corresponding to floor numbers 1-3. In addition, if a building is estimated or determined to have an odd number of floors (either as an inputted constraint, determined by other constraints, or using data retrieved from a building database), the middle floor of the building could be a combination of the 1204 and 1304 at the middle floor, either by taking the minimum from 1204 and the maximum from 1304, the maximum from 1304 and the minimum from 1204, or some other combination.

A simplified example of a portion of a process 1400 for determining an aggregate altitude distribution is shown in FIG. 14, in accordance with some embodiments. The particular steps, order of steps, and combination of steps are shown for illustrative and explanatory purposes only. Other embodiments can implement different particular steps, orders of steps, and combinations of steps to achieve similar functions or results. In some embodiments, each step of the process 1400 is carried out at a server (e.g., the server(s) 130 of FIG. 1) and/or at a mobile device (e.g., in the vicinity of a mobile device 120*a-e* of FIG. 1). The processes for generating a mapping of estimated floor numbers to esti-mated floor labels for a building may be used independently of other processes disclosed herein.

At step 1402, a set of altitude envelope distribution constraints are selected for a physical building that a floor number lookup table is being constructed for (e.g., such as that shown in FIG. 5). As was described above, such altitude envelope distribution constraints include a minimum building height, a maximum building height, a minimum floor height, a maximum floor height, a minimum number of floors, and a maximum number of floors. In some embodiments, the set of altitude envelope distribution constraints includes one or more of such constraints. In other embodiments, no constraints are used and the set of constraints is an empty set. In some embodiments, the set of altitude envelope distribution constraints are selected by, or using, the server(s) 130 based on user provided settings (e.g., a configuration setting), constraint availability from a database, the quality of data in a relevant database (e.g., a building and/or terrain database), or a provided design or tolerance criteria. In other embodiments, the set of altitude envelope distribution constraints are automatically selected by, or using, the server(s) 130 based on an iterative process of trying various constraints to generate an optimized outcome (e.g., an aggregate altitude envelope distribution with minimal overlap between altitude envelopes).

As was described above, in some embodiments, step 1402 includes a sub-step of validating a set of initially selected constraints. For example, the set of initially selected constraints may be validated using general information about building morphology for the region that the physical building is located in. As was described above, such validation includes determining if any of the constraints are improbable given the morphology of buildings in the region that the physical building is located in.

At step 1404, an initial set of altitude envelope distributions is generated, optionally using a first set of one more of the selected altitude envelope distribution constraints. In a first embodiment, each of the altitude distributions includes one or more stacked altitude envelopes, each altitude envelope corresponding to a building floor number of the physical building and being separated from another altitude envelope, or from an initial point, by a floor-to-floor separation value, or a floor-to-ceiling separation value plus a boundary thickness value. With regards to the first embodiment, each of the altitude envelope distributions in the set is determined using a different floor-to-floor separation value, or floor-to-ceiling separation value, that ranges from a minimum value (e.g., 2.5 m) to a maximum value (e.g., 4.5 m). For example, in FIG. 8, the set of altitude envelope distributions included the distributions 602, 604, and 808, where the distribution 602 corresponds to a 2.5 m floor-to-floor separation value, the distribution 604 corresponds to a 3 m floor-to-floor separation value, and the distribution 808 corresponds to a 4 m floor-to-floor separation value. Also in the example shown in FIG. 8, the first altitude envelope distribution constraint, i.e., selected at step 1402, was a constraint on a maximum number of floors that is equal to four floors. Thus, each of the distributions 602, 604, and 808 were constructed so as to only include a maximum number of four floors.

In a second embodiment, the initial set of altitude envelope distributions may be determined by stacking altitude envelopes with a fixed floor-to-floor separation value, such as 3 m, until the height of the building is met or exceeded. While this approach is simple, it may be sensitive to error accumulation, especially at higher floors.

In a third embodiment, the initial set of altitude envelope distributions for a building may be determined by dividing the height of a building by the number of floors therein, provided that both values are known (e.g., from a building database). For example, an 8 m building with two floors likely has a ground floor having an altitude envelope spanning 0 m to 4 m from the bottom of the building, and a top floor having an altitude envelope spanning 4 to 8 m. However, such calculated altitude envelopes would have clearly delineated boundaries that do not overlap with each other, and may not properly characterize a user that is close to the boundary value. In the given example, a user altitude of 4.001 m would be assigned to the top floor of the building (having an altitude envelope that spans 4 to 8 m) without reflecting that the user is 0.001 m from the boundary of the ground floor.

In contrast to the latter two embodiments, the first embodiment, as disclosed herein, advantageously enables a wide-range of floor separation values to be considered and for non-physical floor-to-floor separation values (i.e., improbably short floors based on human height) to be filtered from the altitude envelope distribution. Additionally, the first embodiment, as disclosed herein, advantageously allows for non-uniform floor-to-floor separation values. In contrast to the latter two embodiments, the first embodiment, as disclosed herein, advantageously allows for a buffer of floor ranges to be generated (i.e. floor ranges that overlap), which can be used to determine when a user's altitude could confidently be assigned to one or more adjacent floors in addition to the determined floor.

With reference to the previous example, floor ranges having an overlap (e.g., a ground floor of a building spanning in altitude from 0 to 4.25 m and a top floor of the building spanning in altitude from 3.75 to 8.25 m) advantageously improve floor number estimation as compared to a simple approach having no overlap. For example, a user elevation of 4.001 m would be mapped to potentially being at the ground floor or the top floor of the building, as opposed to the simple approach which would only assign the user position to the top floor. If the user's elevation of 4.001 m were noisy and happened to fluctuate by a few millimeters, the user's floor number would jump around between the ground floor and the top floor of the building, as opposed to some embodiments disclosed herein that specify both of the overlapping floors. In addition, if the user's elevation also had a determined confidence/uncertainty of 4.5 m+/−0.4 m, then the overlap between the user's elevation range of 4.1 m to 4.9 m could indicate the ground floor or the top floor, as opposed to the simple approach which would still indicate only the top floor, resulting in a noisy floor number estimation and poor user experience.

Returning attention to FIG. 14, at step 1406, a second one or more of the selected altitude envelope distribution constraints is applied to the set of altitude envelope distributions to filter the set of altitude envelope distributions. In the example shown in FIG. 8, the second altitude envelope distribution constraint, i.e., selected at step 1402, is a constraint on a maximum building height that is equal to 20 m. In the example shown in FIG. 8, because the constraint on a maximum building height produces a non-physical building for the distribution 808, as discussed above, the distribution 808 is filtered from the set of aggregate altitude envelope distributions and is thereafter not used to generate the aggregate altitude envelope distribution 606.

At step 1408, the remaining set of altitude envelope distributions is used to determine an aggregate altitude envelope distribution. In situations where a second one or more of the selected altitude envelope distribution constraints was not applied to the set of altitude envelope distributions at step 1406, the remaining set of altitude envelope distributions is the same as the initial set of altitude envelope distributions generated at step 1404. Similarly, in a scenario where no constraints were selected, or if none of the initial constraints passed validation, the remaining set of altitude envelope distributions is the same as the initial set of altitude envelope distributions determined at step 1404.

At step 1410, an absolute aggregate altitude envelope distribution is generated using the aggregate altitude envelope distribution. As compared to the altitude values of the aggregate altitude envelope distribution which are relative to that of the terrain, altitude values of the absolute altitude envelope distribution are each an absolute altitude value with respect to a reference frame, such as a height-above-ellipsoid, which is the height above the Earth ellipsoid. To generate the absolute aggregated altitude envelope distribution, once a building's aggregate altitude envelope distribution is estimated, it is added to a reference altitude value such as height-above-ellipsoid altitude value of the lowest floor. The reference altitude value of the lowest floor can be determined in numerous ways, including:

a) Querying a terrain database within the building footprint and averaging the result across the building footprint. Alternatively, the minimum or maximum terrain or some other statistical metric may be used; and/or b) Querying a terrain database outside the building footprint (out to some buffer like 10 m) and averaging the results. This is beneficial for terrain databases that may not sufficiently handle building removal in their modeling. Alternatively, the minimum or maximum terrain or some other statistical metric may be used. For a building that is on a sloped surface and the lowest floor entrance is located on the lowest portion of the terrain, the minimum terrain would likely indicate the altitude of the ground of the lowest floor; and/or c) Querying a building database, if available, to retrieve the reference altitude value of the lowest floor directly.

At step 1412, the absolute aggregate altitude envelope distribution, and optionally the (relative) aggregate altitude envelope distribution are stored for immediate or later use. In some embodiments, the absolute aggregate altitude envelope distribution is stored as a floor number lookup table at a database and in association with the physical building (e.g., by address, building name or designator, and/or coordinates or as part of a larger data structure). Additionally, at step 1414, a mapping of estimated floor numbers to estimated floor labels is optionally generated. Details of step 1414 are described below with reference to FIG. 21.

As is described below, the floor number lookup table can be used, e.g., by a server and/or a mobile device, to estimate which floor of a physical building that a mobile device is on by using an estimated altitude of the mobile device and the absolute aggregate altitude envelope distribution. Thus, once a building's absolute floor number distribution is known (i.e., having been generated or retrieved from storage), altitude data (e.g., from a mobile device) may be mapped to a floor number. The processes and techniques disclosed herein for i) determining an aggregate altitude envelope distribution, ii) mapping an estimated altitude (and optionally an altitude uncertainty/confidence), of a mobile device to a floor number using an altitude envelope distribution, and iii) reporting the mapped floor number to an endpoint may be used in conjunction or independently of one another. That is, an aggregate altitude envelope distribution determined using the techniques and processes disclosed herein may be used with an alternative process (i.e., as compared to those disclosed herein) for mapping an estimated altitude (and optionally an altitude uncertainty/confidence) of a mobile device to a floor number using an altitude envelope distribution, and/or an alternative process for reporting the mapped floor number to an endpoint. Similarly, the techniques and processes for mapping an estimated altitude (and optionally an altitude uncertainty/confidence) of a mobile device to a floor number using an altitude envelope distribution as disclosed herein may be used with an alternative process for determining an aggregate envelope distribution and/or an alternative process for reporting the mapped floor number to an endpoint. Additionally, the techniques and processes for reporting the mapped floor number to an endpoint disclosed herein may be used with an alternative process for determining an aggregate altitude envelope distribution and/or an alternative process for mapping an estimated altitude of a mobile device to a floor number using an altitude envelope distribution.

FIG. 15 includes a simplified example of a portion of a process 1500 that may be used as a first embodiment of step 1412 of FIG. 14 for using an absolute aggregate altitude envelope distribution to estimate a building floor number based on an estimated altitude of a mobile device. The particular steps, order of steps, and combination of steps are shown for illustrative and explanatory purposes only. Other embodiments can implement different particular steps, orders of steps, and combinations of steps to achieve similar functions or results. In some embodiments, each step of the process 1500 is carried out at a server (e.g., the server(s) 130 of FIG. 1) and/or at a mobile device. The processes 1500 for using an absolute aggregate altitude envelope distribution to estimate a building floor number based on an estimated altitude (and optionally an altitude uncertainty/confidence) of a mobile device may be used in conjunction with, or independently of, other processes disclosed herein.

Figure 16:
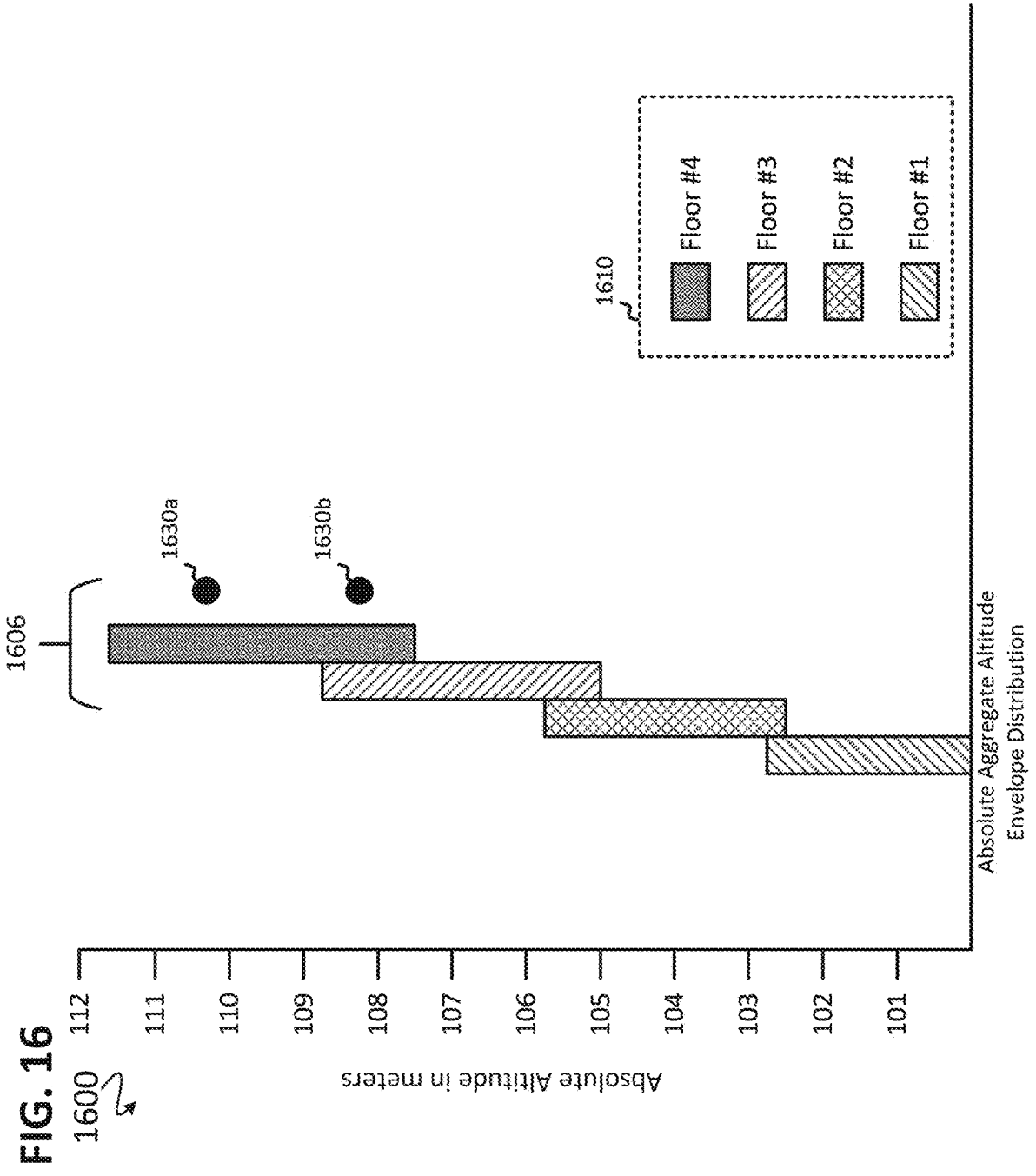
FIG. 16 shows a graphical representation of an example absolute aggregate altitude envelope distribution, in accordance with some embodiments.

The steps of process 1500 are described with reference to the example graph 1600 of FIG. 16 that includes an absolute altitude envelope distribution 1606, a legend 1610, and estimated altitudes 1630a-b, in accordance with some embodiments. In some scenarios, as discussed below, it may be uncertain which building a mobile device is in. In such scenarios, in some embodiments, the steps of the process 1500 are performed for each building within a list of possible buildings that the mobile device may be located within. In other embodiments, if the buildings are of similar distributions, the distributions may be combined.

At step 1502, an estimated altitude of a mobile device is identified (e.g., either of 1630a or 1630b). As described above, an estimated altitude of the mobile device may be determined based on measurements of atmospheric pressure made by a barometric pressure sensor of the mobile device and/or using positioning signals received at the mobile device. In some situations, the estimated altitude may be an estimated altitude received at a server from the mobile device. In other situations, the estimated altitude may be retrieved from a server, or from another source. In some embodiments, the entire altitude estimation process may be performed at the mobile device. At step 1504, for each floor number of the absolute altitude envelope distribution, if the estimated altitude is within an altitude envelope corresponding to that floor number, that floor number is added to a list of estimated floor numbers. With reference to FIG. 16, if the estimated altitude from step 1502 is the estimated altitude 1630a, then the list of estimated floor numbers would only include floor number 4. However, if the estimated altitude from step 1502 is the estimated altitude 1630b, then the list of estimated floor numbers would include both floor number 4 and floor number 3 because the estimated altitude 1630b is within the altitude envelope corresponding to floor number 4 as well as within the altitude envelope corresponding to floor number 3 based on the overlap thereof. At step 1506, the list of estimated floor numbers is returned to an endpoint such as a user of the mobile device, a first responder, a computer system, a server, and/or a device that initiated the process 1500.

FIG. 17 includes a simplified example of a portion of a process 1700 that may be used as a second embodiment of step 1412 of FIG. 14 for using the absolute aggregate altitude envelope distribution to estimate a building floor number based on an estimated altitude. The particular steps, order of steps, and combination of steps are shown for illustrative and explanatory purposes only. Other embodiments can implement different particular steps, orders of steps, and combinations of steps to achieve similar functions or results. In some embodiments, each step of the process 1700 is carried out at a server (e.g., the server(s) 130 of FIG. 1) and/or at a mobile device. The processes 1700 for using an absolute aggregate altitude envelope distribution to estimate a building floor number based on an estimated altitude (and optionally an altitude uncertainty/confidence) of a mobile device may be used in conjunction with, or independently of, other processes disclosed herein.

In some scenarios, as discussed below, it may be uncertain which building a mobile device is in. In such scenarios, in some embodiments, the steps of the process 1700 are performed for each building within a list of possible buildings that the mobile device may be located within.

The steps of process 1700 are described with reference to the example graph 1800 of FIG. 18 that includes an absolute altitude envelope distribution 1806, a legend 1810, an estimated altitude 1830, a first vertical distance magnitude 1840, a second vertical distance magnitude 1842, and vertical central tendencies 1852a-d.

At step 1702, an estimated altitude of a mobile device is identified (e.g., 1830). In some situations, the estimated altitude may be an estimated altitude determined using a mobile device that is inside of a building that corresponds to the absolute altitude envelope distribution. In other situations, the estimated altitude may be an altitude value retrieved from a server or from another source.

At step 1704, for each floor number of the absolute altitude envelope distribution (e.g., 1806), a vertical central tendency (e.g., 1852a-d) is calculated for the altitude envelope that corresponds to that floor. In some embodiments, each vertical central tendency is a mean or median of the corresponding altitude envelope. For example, in some embodiments, the vertical central tendency for an altitude envelope may be calculated as follows:

$$\text{central tendency} = \frac{\text{altitude envelope min} + \text{altitude envelope max}}{2}. \tag{Equation 11}$$

At step 1706, a distance magnitude between the estimated altitude and the vertical central tendency is calculated for each altitude envelope of the absolute altitude envelope distribution. The distance magnitude (e.g., 1840, 1842) is calculated for an altitude envelope by determining the absolute value of a difference between the estimated altitude value (e.g., 1830) and the central tendency of that altitude envelope (e.g., 1852*d*, 1852*c*).

At step 1708, for each floor number of the absolute altitude envelope distribution, that floor number is conditionally added to a list of estimated floor numbers based on the distance magnitude for the altitude envelope of that floor number.

Conditionally adding the floor number to the list of estimated floor numbers involves adding the floor number to the list of estimated floor numbers based on one or more specified conditions. If the condition is met, the floor number is added to the list of estimated floor numbers. If the condition is not met, the floor number is not added to the list of estimated floor numbers. For example, in some embodiments, a floor number is added to the list of estimated floor numbers if the distance magnitude is the smallest distance magnitude as compared to the distance magnitudes corresponding to the other floor numbers. In such embodiments, all other floor numbers are excluded from the list of estimated floor numbers. In other embodiments, a floor number is added to the list of estimated floor numbers if the floor number's corresponding distance magnitude is less than a given threshold (e.g., 5 meters). In such embodiments, all other floor numbers are excluded from the list of estimated floor numbers. In yet other embodiments, all of the floor numbers are added to the list of estimated floor numbers and the list of estimated floor numbers is ordered by distance magnitude along with confidences that map from the distance magnitude. In each of these embodiments, the list of estimated floor numbers may also include the distance magnitude value corresponding to each of the estimated floor numbers.

Figure 18:
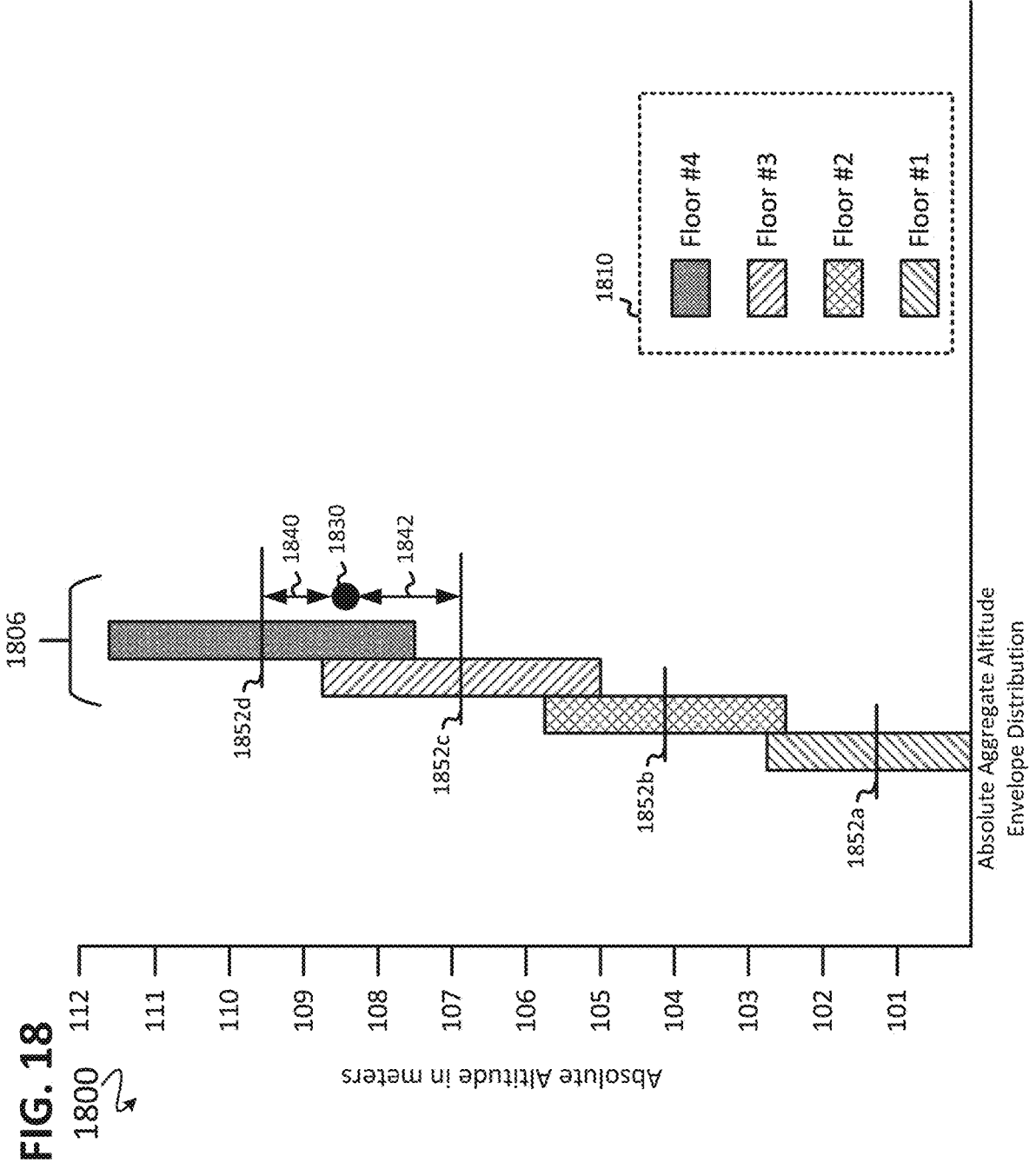
FIG. 18 shows a graphical representation of an example absolute aggregate altitude envelope distribution, in accordance with some embodiments.

For example, with reference to FIG. 18, if the estimated altitude from step 1702 is the estimated altitude 1830, then the list of estimated floor numbers may only include floor number 4 because the distance magnitude 1840 is less than the distance magnitude 1842. In other embodiments, the list of estimated floor numbers may only include floor number 4 if the distance magnitude 1840 is less than a threshold value and the distance magnitude 1842 is greater than the threshold value. In yet other embodiments, the list of estimated floor numbers may include all of the floor numbers, and it would be ordered from the smallest distance magnitude to the largest distance magnitude (i.e., floor number 4, floor number 3, floor number 2, and then floor number 1). At step 1710, the list of estimated floor numbers and/or floor labels is returned to an endpoint (e.g., to a server, mobile device, and/or device that initiated the process 1700).

FIG. 19 includes a simplified example of a portion of a process 1900 that may be used as a third embodiment of step 1412 of FIG. 14 for using the absolute aggregate altitude envelope distribution to estimate a building floor number based on an estimated altitude. The particular steps, order of steps, and combination of steps are shown for illustrative and explanatory purposes only. Other embodiments can implement different particular steps, orders of steps, and combinations of steps to achieve similar functions or results. In some embodiments, each step of the process 1900 is carried out at a server (e.g., the server(s) 130 of FIG. 1) and/or at a mobile device. The processes 1900 for using an absolute aggregate altitude envelope distribution to estimate a building floor number based on an estimated altitude (and optionally an altitude uncertainty/confidence) of a mobile device may be used in conjunction with, or independently of, other processes disclosed herein.

In some scenarios, as discussed below, it may be uncertain which building a mobile device is in. In such scenarios, in some embodiments, the steps of the process 1900 are performed for each building within a list of possible buildings that the mobile device may be located within. In some embodiments, if the buildings are of similar distributions, the distributions may be combined.

Figure 20:
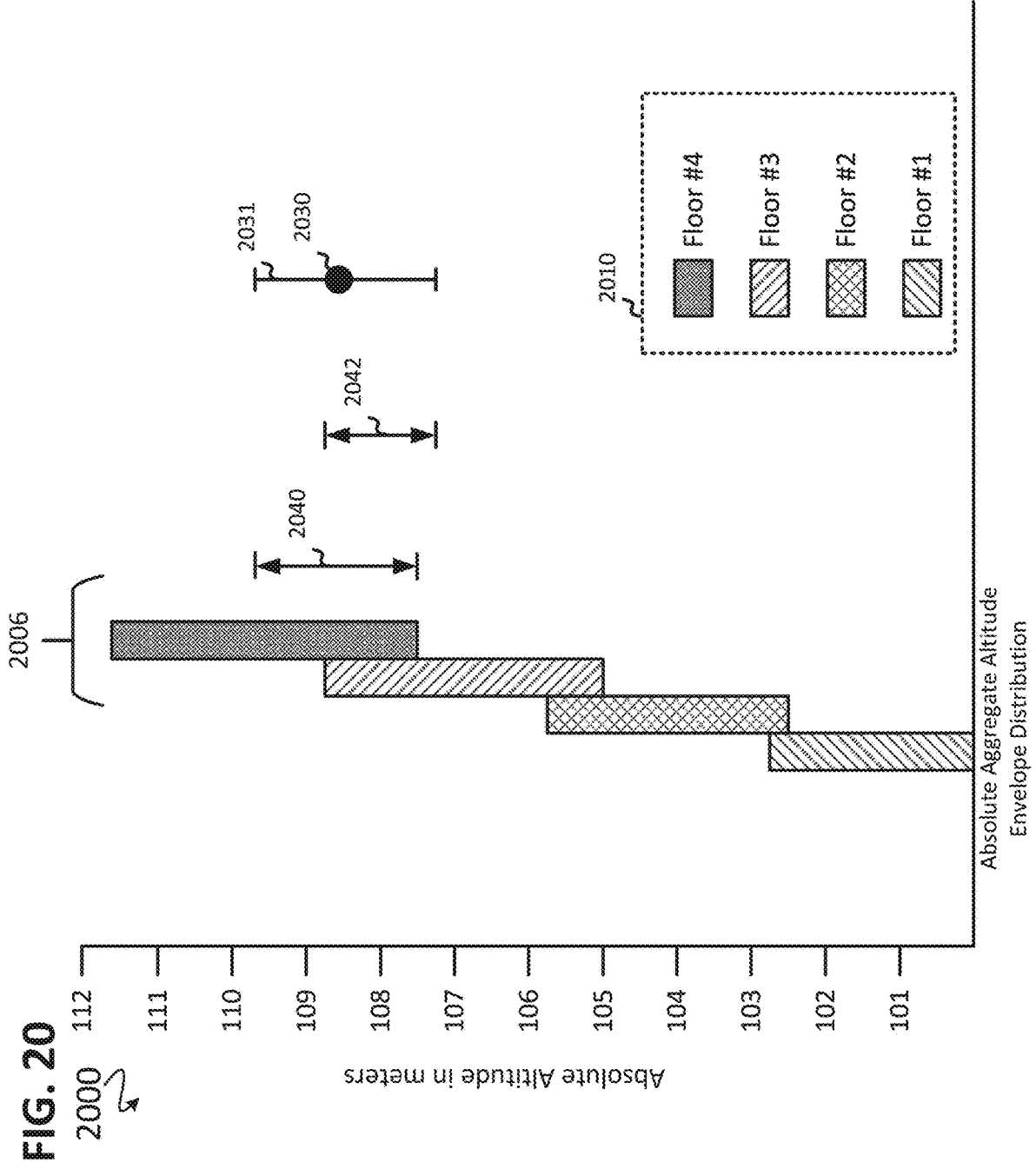
FIG. 20 shows a graphical representation of an example absolute aggregate altitude envelope distribution, in accordance with some embodiments.

The steps of process 1900 are described with reference to the example graph 2000 of FIG. 20 that includes an absolute altitude envelope distribution 2006, a legend 2010, a first calculated altitude overlap value 2040, a second calculated altitude overlap value 2042, an estimated altitude 2030, and a confidence interval 2031, in accordance with some embodiments.

At step 1902, estimated altitude data of a mobile device is identified (e.g., 2030). In some situations, the estimated altitude data includes an estimated altitude and an uncertainty/confidence interval corresponding to the estimated altitude, usually represented as X+/−Y m, though the interval may also be asymmetric (+Y m, −Z m). As shown in FIG. 20, the estimated altitude data 2030 includes an estimated altitude 2030 which is represented by a dot, and a corresponding confidence interval 2031 which is represented by whiskers centered at the dot. In some embodiments, the estimated altitude data may be received from a mobile device. In other situations, the estimated altitude data may be retrieved from a server or another source.

A lower bound of the altitude data is calculated as follows, where the estimated altitude confidence value is half of an estimated altitude confidence interval when the confidence interval is symmetrical, or a portion of the estimated altitude confidence interval when the confidence interval is asymmetrical:

$$\text{Lower Bound}=(\text{estimated altitude})-(\text{estimated altitude confidence value}) \qquad \text{(Equation 12)},$$

and an upper bound of the altitude data is calculated as follows:

$$\text{Upper Bound}=(\text{estimated altitude})+(\text{estimated altitude confidence value}) \qquad \text{(Equation 13)}.$$

In some embodiments, the confidence interval, or estimated altitude confidence value, is determined or calculated as described in U.S. Pat. No. 10,655,961, issued May 19, 2020 and/or U.S. patent application Ser. No. 17/447,027, filed Sep. 7, 2021, both of which are incorporated herein in their entirety. In other embodiments, the confidence interval, or estimated altitude confidence value, is already calculated by another process. In yet other embodiments, the confidence interval, or estimated altitude confidence value is a fixed value.

At step 1904, for each floor number of the absolute altitude envelope distribution, an altitude overlap value between the altitude data and the altitude envelope that corresponds to that floor is calculated. In some embodiments, the altitude data as described herein includes an estimated altitude value and optionally includes an altitude uncertainty/confidence value associated with the estimated altitude. The altitude overlap value for a given floor may include a vertical span (e.g., 5 m) or an overlap percentage (e.g., 10%) for which an altitude range between the Lower Bound of Equation 12 and the Upper Bound of Equation 13 overlaps with an altitude range between an altitude envelope minimum value and altitude envelope maximum value for that floor. For example, in FIG. 20, the confidence interval 2031 overlaps the altitude envelope of floor number 4 by the first altitude overlap value 2040. Similarly, the confidence interval 2031 overlaps the altitude envelope of floor number 3 by the second altitude overlap value 2042.

At step 1906, for each floor number of the absolute altitude envelope distribution, that floor number is added to a list of estimated floor numbers based on the calculated overlap value for that floor number. In some embodiments, a floor number is added to the list of estimated floor numbers if the calculated altitude overlap value for that floor is the largest calculated altitude overlap value as compared to the calculated altitude overlap values corresponding to the other floor numbers. In such embodiments, all other floor numbers are excluded from the list of estimated floor numbers. In other embodiments, a floor number is added to the list of estimated floor numbers if the floor number's corresponding calculated altitude overlap value is greater than a given percentage threshold (e.g., 20%) or a distance range (e.g., 3 m) when measured relative to either the altitude envelope range or the mobile device's estimated altitude range. In such embodiments, all other floor numbers are excluded from the list of estimated floor numbers. In yet other embodiments, all of the floor numbers are added to the list of estimated floor numbers and the list of estimated floor numbers is ordered by their respective calculated altitude overlap values. In each of these embodiments, the list of estimated floor numbers may also include the associated confidence interval of the estimated altitude data. In addition, in each of these embodiments, the list of estimated floor numbers may also include the associated confidence interval or uncertainty for each of the floor numbers. At step 1908, the list of estimated floor numbers is returned to an endpoint (e.g., to a server, mobile device, and/or device that initiated the process 1900).

Because a user's experience may only align with the floor labels (i.e., what is observed) and not the true floor number, it may be necessary, or desirable, to convert between an estimated floor number to a corresponding estimated floor label. In some embodiments, a list of rules for the removal and addition of floor labels is first compiled. Such lists can be geographic-specific, morphology-specific, or building type-specific. For example, the list of rules could specify that all buildings within a geofence in downtown San Francisco do not have a "floor 13". In another example, the list could specify that buildings in Montreal's postal codes have "Ground Floors" as the bottom floor, and the 1st floor is directly above the Ground Floor. In another example, the list of rules could specify that buildings above 10 meters tall in Beijing lack all floor labels with "4" in them. In another example, the list or rules could combine multiple rules. Such lists of rules can be augmented with specific exceptions, such as particular buildings that are known to follow a different pattern or have a predefined floor label scheme.

In some embodiments, different floors in a building can have mixed uses. For example, a building can have the north side that includes a bedroom and hallway, and the south side that includes an attic space. In such cases, the 2D position of the user becomes important in determining floor labels.

Figure 21:
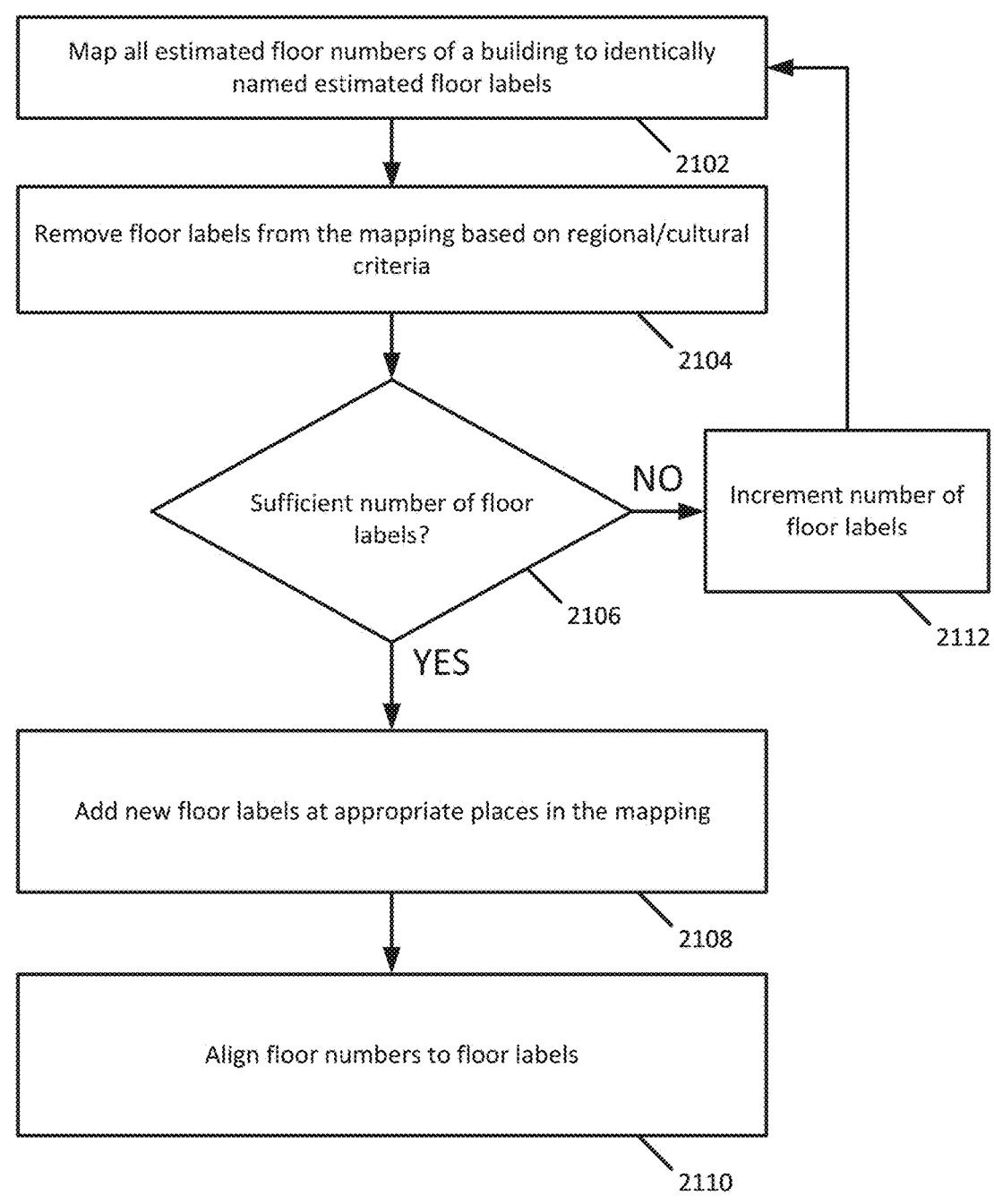
FIG. 21 includes a simplified example of a portion of a process for mapping floor numbers to floor labels, in accordance with some embodiments.

FIG. 21 shows a portion of process 2100 that is an example embodiment of step 1414 shown in FIG. 14 to optionally generate a mapping of estimated floor numbers to estimated floor labels for the building, in accordance with some embodiments. The particular steps, order of steps, and combination of steps are shown for illustrative and explanatory purposes only. Other embodiments can implement different particular steps, orders of steps, and combinations of steps to achieve similar functions or results. In some embodiments, each step of the process 2100 is carried out at a server (e.g., the server(s) 130 of FIG. 1) and/or at a mobile device. The processes for generating a mapping of estimated floor numbers to estimated floor labels for a building may be used in conjunction with, or independently of, other processes disclosed herein.

At step 2102, each estimated floor number of an absolute aggregate altitude distribution of a building is mapped to identically named estimated floor labels (e.g., by a server). For example, floor number 1 is mapped to "floor number 1" or "first floor", floor number 2 is mapped to "floor number 2" or "second floor", and so on. The terms "map", "mapped", "mapping", and "translate", in this context, means to logically, descriptively, and/or programmatically associate one or more items to one or more other items (e.g., in a database, dataset, or other data object).

At step 2104, floor labels are flagged or removed from the mapping based on regional and/or cultural criteria. For example, the "13th floor", "4th floor", "39th floor", may be considered to be "unlucky" in some cultures. In some embodiments, step 2104 involves assembling, identifying, or retrieving a list of rules (e.g., from a server) that may be regionally specific or include a building-to-building context. Such rules are similar to those described above, e.g., buildings in San Francisco may not have a "13th floor". Floor labels are then removed from the mapping based on those rules.

At step 2106, it is determined if there is a sufficient number of floor labels (i.e., there is at least one available floor label for each floor number). If it is determined that there is a sufficient number of floor labels, flow continues to step 2108.

At step 2108, new floor labels are added to the mapping at appropriate places (e.g., "Lobby", "Mezzanine", "Observatory") (e.g., by a server). In some embodiments, step 2108 involves assembling, identifying, or retrieving a list of rules that may be regionally specific or be on a building-to-building context (e.g., from a server). Such rules are similar to those described above, e.g., buildings in Montreal may have a "Ground Floor". Floor labels are then added to the mapping based on those rules.

Then, at step 2110, the estimated floor numbers are aligned to the estimated floor labels and excess estimated floor labels are discarded (e.g., by a server). An excess number of floor labels is the inverse problem of having an insufficient number of floor labels as determined at step 2106. For example, if the estimated floor label "13$^{th}$ floor" was removed from the mapping, then the estimated floor number 13 would be aligned to the floor label "14$^{th}$ floor".

Alternatively, if a building database includes all possible residential unit numbers, the format of such residential unit numbers could be interpreted as the possible floor labels. For example, if an apartment complex included apartment numbers 101, 102, 201, and 202, then the floor labels could use the first digit of the apartment numbers to establish floor labels 1 and 2 for such a complex. Or, if an additional source of floor labels (e.g., a list of elevator buttons from all elevator banks in a building, or a list of floors from building plans) is available, such information may be used by the server to establish floor labels.

Because each region may have hundreds of physical buildings, and each building may have many possible permutations of floor labels, and because large datasets of regional and cultural rules are considered, in addition to consideration of large datasets which may contain known apartment numbers, elevator button information, etc., the process 2100 is advantageously performed by one or more servers that are operable to access and operate on large datasets.

If it was determined at step 2106 that the amount of floor labels is less than the number of floor numbers, flow continues to step 2112 where the number of floor labels is incremented by one or more. Flow then returns to step 2102 for reprocessing with a larger buffer of possible floor labels.

FIG. 22 shows a portion of process 2200, which is an example embodiment of step 1412 shown in FIG. 14, in accordance with some embodiments. The particular steps, order of steps, and combination of steps are shown for illustrative and explanatory purposes only. Other embodiments can implement different particular steps, orders of steps, and combinations of steps to achieve similar functions or results. In some embodiments, each step of the process 2200 is carried out at a server (e.g., the server(s) 130 of FIG. 1) and/or at a mobile device.

Figure 23:
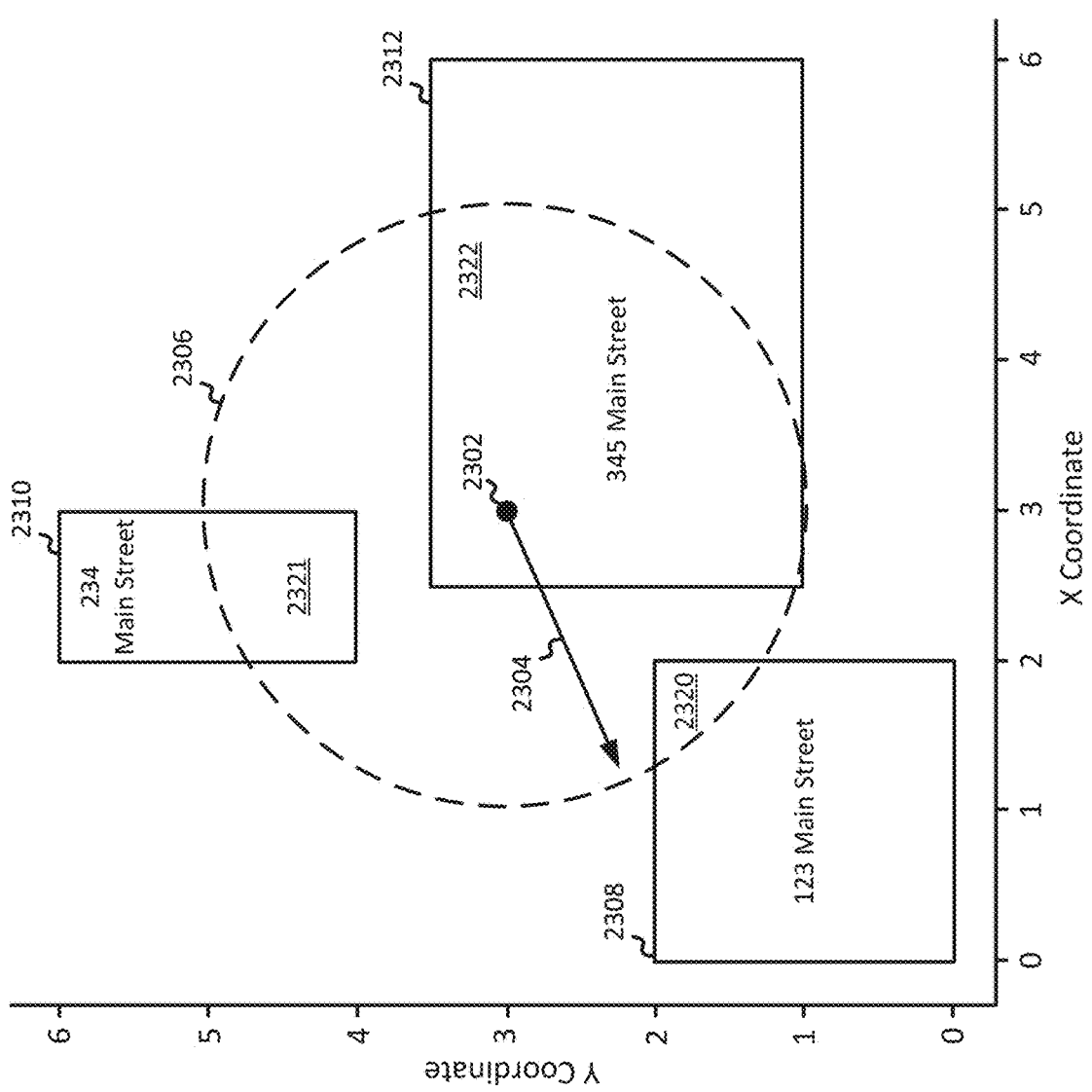
FIG. 23 shows a simplified top-down view of an operational environment, in accordance with some embodiments.

A portion of the process 2200 is described with reference to graph 2300 shown in FIG. 23, in accordance with some embodiments. The graph 2300 provides a simplified top-down view of an operational environment which includes a centroid 2302 of an estimated position of a mobile device, a confidence 2304 of the estimated position that forms a radius of a 2D (two-dimensional) confidence region 2306, a first building polygon 2308, a second building polygon 2310, and a third building polygon 2312. A building polygon is at least a two-dimensional top-down outline of a physical building. Building polygons may be stored and retrieved from a building, terrain, or topology dataset, as is known in the art. Also shown are overlap regions 2320, 2321, and 2322. The overlap regions 2320, 2321, and 2322 are each defined by the overlapped portion of that region's respective building polygon and the interior of the confidence region 2306.

In some embodiments, the 2D confidence region 2306 is a uniform density distribution (e.g., normally distributed, or other distribution). In other embodiments, the 2D confidence region 2306 adheres to a non-uniform distribution, such as a weighted distribution having greater weights closer to the centroid 2302 and lesser weights farther from the centroid 2302. For a uniform distribution, two overlapping building footprints having the same area of overlap (e.g., 10%) may have the same significance when being sorted according to which building the mobile device is most likely within. However, in embodiments where the 2D confidence region 2306 adheres to a non-uniform distribution, a region of overlap that is closer to the centroid 2302 may be weighted more than a similarly sized region of overlap that is farther from the centroid 2302. The applied overlap region weights could then be used when the overlap regions are being sorted to determine which building the mobile device is most likely within.

In the example shown, the first building polygon 2308 corresponds to a building located at "123 Main Street", or identified by name or designator (e.g., "Empire State Building", "Building 1", "A1", etc.), that is 50 m tall, has 17 stories, has a 2.5% overlap at overlap region 2320 with the 2D confidence region 2306, and has a nearest distance of 1.41 units to the centroid 2302. That is, 2.5% of the 2D confidence region 2306 overlaps with the first building polygon 2308.

The second building polygon 2310 corresponds to a building located at "234 Main Street" that is 30 m tall, has 9 stories, has a 7.3% overlap region 2321 with the 2D confidence region 2306, and has a nearest distance of 1 unit to the centroid 2302. That is, 7.3% of the 2D confidence region 2306 overlaps with the second building polygon 2310.

The third building polygon 2312 corresponds to a building located at "345 Main Street" that is 20 m tall, has 6 stories, has a 42.8% overlap region 2322 with the 2D confidence region 2306, and has a nearest distance of 0 units to the centroid 2302, since the centroid is located within 2312. That is, 42.8% of the 2D confidence region 2306 overlaps with the third building polygon 2312.

Returning attention to FIG. 22, at step 2202, an estimated user position (e.g., located at the centroid 2302) and an estimated user altitude are determined (i.e., a 3D (three-dimensional) estimated position). In some situations, the estimated user position and estimated altitude may be determined using a mobile device (i.e., that the user is carrying) and may refer to an estimated position and/or estimated altitude of a mobile device. In other situations, the estimated user position and estimated altitude may be values retrieved from a server or another data source. As described above, in some embodiments, a 2D position of a mobile device may be determined using positioning signals received at the mobile device. An altitude of the mobile device may be determined using similar positioning signals and/or may be based on atmospheric pressure measurements made using a barometric pressure sensor of the mobile device.

At step 2204, one or more physical buildings that correspond to the estimated user position are identified. For an estimated 3D fix (e.g., a cylindrical volume that includes all 3D uncertainties, or an ellipsoid, etc.), all building polygons that overlap with the 2D confidence region of the estimated position (e.g., 2306) are included within a set of potential buildings in which the user device could be located. For example, as shown in FIG. 23, the 2D confidence region 2306 overlaps with building polygons 2308, 2310, and 2312. Thus, the initial set of potential buildings includes buildings corresponding to the building polygons 2308, 2310, and 2312. In some embodiments, potential buildings may be removed from the set if a height of those buildings does not overlap in altitude with the estimated altitude of the estimated position. For example, if the estimated altitude of the user device is 100 m, then any building that has a height of less than 100 m (or less than 100 m and some buffer to account for rounding, altitude uncertainty, and building database uncertainty) would be removed from the set of potential buildings (e.g., if a user is estimated to be near the top floor of the Empire State Building and has a 400 m 2D uncertainty, the user is not likely in the other buildings and thus a much better 2D uncertainty may be inferred than what is provided). With reference to FIG. 23, due to the proximity of the centroid 2302 to the third building polygon 2312, "345 Main Street" is likely the closest building and will be sorted first in a returned list of possible buildings and their respective floor estimates. However, if the altitude value of the estimated position at the centroid 2302 is outside the range of possible floors for 345 Main Street, that building may be removed from the application programming interface (API) response that lists the potential buildings.

In some embodiments, if the remaining number of buildings in the set of potential buildings is equal to zero, there are several options that include any combination of: not returning an estimated floor number to a user, warning the user that no corresponding building is detected in the area of the estimated position, and/or, using an estimated floor number "base case". The estimated floor number base case assumes no constraints on building height or the number of stories and translates the height-above-ellipsoid or height-above-terrain associated with the estimated position to an estimated floor number and an estimated floor number confidence using the process 2200, but warns the user that no building is detected.

In some embodiments, if the remaining number of buildings in the set of potential buildings is equal to one, the height-above-ellipsoid or height-above-terrain associated with the estimated position is translated to an estimated floor number and an estimated floor number confidence using the process 2200.

In some embodiments, if the remaining number of buildings in the set of potential buildings is greater than one, for each building in the set of potential buildings, the height-above-ellipsoid or height-above-terrain associated with the estimated position is translated to an estimated floor number, and an estimated floor number confidence using the process 2200. In some embodiments, an estimated floor number for each building is returned to the user, listed separately, but ordered by likely building. In some embodiments, the most likely building may be estimated by computing a metric of the distance between the centroid (e.g., 2302) and each building polygon and sorting by that metric. In such embodiments, the metric is a mean distance, a median distance, or an overlap of a 2D confidence region (e.g., 2306) and the building polygons. In other embodiments, the potential buildings may be sorted by percent overlap with the 2D confidence region (e.g., 2306).

In other embodiments, the metric is a measure of overlap area, and the buildings may be sorted by the area of an overlapped building polygon with a user's 2D confidence region rather than by percentage. In yet other embodiments, the metric is a proportional overlap and the buildings may be sorted by the proportional overlap of an overlapped building polygon with a user's 2D confidence region. A proportional overlap is calculated by dividing an overlap area by the total area of the building polygon. As such, a very small building polygon that is completely overlapped with a user's 2D confidence region would be sorted ahead of a very large building that is partially overlapped with a user's 2D confidence region.

In still yet other embodiments only buildings in the set may be included, or "Outdoors" may be included as an option if there is significant overlap with the outdoors (i.e., there is no significant overlap with buildings).

Returning attention to FIG. 22, at step 2206, an absolute aggregate altitude envelope distribution that corresponds to each of the potential buildings in the set is identified. In some embodiments, the absolute aggregate altitude envelope distributions are retrieved from the server or database that was used to store the absolute aggregate altitude envelope distribution as described with reference to step 1412 of the process 1400. At step 2208, for each building in the set of potential buildings, a list of estimated floor numbers is determined using the estimated altitude and the absolute aggregate altitude envelope distribution for that building. In some embodiments, in addition to, or instead of, the estimated floor number, an estimated floor label is determined using the estimated floor number to estimated floor label mapping described with reference to FIG. 21.

At step 2210, after a set of potential buildings is assembled and associated estimated floor numbers (with ranges) have been computed for each of the buildings in the set, the estimated floor number may be reported, or returned, to an endpoint (e.g., a user, a mobile device, a server, or a device that initiated the process 2200). In some embodiments, the estimated floor number is returned to the endpoint via an application programming interface (API). The techniques and processes for generating the contents of an API response that is returned to an endpoint as disclosed herein may be used in conjunction with, or independently of, other processes disclosed herein.

In some embodiments, an API response could be in the general form of Estimated floor number={{ADDRESS0, FLOORRANGE0, STATUS0}, {ADDRESS1, FLOORRANGE1, STATUS1}, . . . }. For example, if the user's height-above-terrain is equal to (26+/−3) meters and the user's position overlapped with three buildings, as shown in FIG. 23, then one building that is too short may be excluded from the set of potential buildings (i.e., 345 Main Street), and the remaining buildings may be sorted by distance to the user centroid, e.g., Estimated floor number={{"234 Main Street", "8+/−1", " "}, {"123 Main Street", "10+/−2", " "}}. In some embodiments, the distance to the user centroid is returned as part of the API response. In some embodiments, the distance to the user centroid is returned as part of the API response and the results are sorted by the receiving system.

In other embodiments, the floor representation can also be defined as a range of floors, e.g., Estimated floor number={{"234 Main Street", "7, 8, 9", " "}, {"123 Main Street", "8, 9, 10, 11", " "}}. Alternatively, the floor representation can also be defined with asymmetric errors, e.g., Estimated floor number={{"234 Main Street", "8+/−1", " "}, {"123 Main Street", "10+1−2", " "}}.

In yet other embodiments, the short building can be included in the API response, but its status is flagged, e.g., Estimated floor number={{"345 Main Street", " ", "Short building"}, {"234 Main Street", "8+/−1", " "}, {"123 Main Street", "10+1−2", " "}}.

In still yet other embodiments, the outdoor portion can be included in the API response since it is the largest overlap portion, e.g., Estimated floor number={{"Outdoors", " ", " "}, {"234 Main Street", "8+/−1", " "}, {"123 Main Street", "10+/−2", " "}}.

In still yet other embodiments, the floor representation can be defined with percent confidences, e.g., Estimated floor number={{"234 Main Street", "8 (80%), 7 (10%), 9 (10%)", " "}, {"123 Main Street", "10 (60%), 9 (10%), 8 (10%), 11 (20%)", " "}}.

In still yet other embodiments, the floor or address representation can be ranked by percent confidences, but not reveal the individual confidences, e.g., Estimated floor number={{"234 Main Street", "8, 7, 9", " "}, {"123 Main Street", "10, 9, 8, 11", " "}}.

In still yet other embodiments, the floor representation can be the highest confidence floor/most likely floor (with or without confidences revealed), followed by a range of floors (with or without confidences revealed), e.g., Estimated floor number={{"234 Main Street", "8 (80%), [8 (80%), 7 (10%), 9 (10%)]", " "}, {"123 Main Street", "10 (60%), [10 (60%), 9 (10%), 8 (10%), 11 (20%)]", " "}}, Estimated floor number={{"234 Main Street", "8, [8, 7, 9]", " "}, {"123 Main Street", "10, [10, 9, 8, 11]", " "}}.

In still yet other embodiments, the floor representation can be defined with percent confidences but only the floor having the highest confidence value per building is returned, e.g., Estimated floor number={{"234 Main Street", "8 (80%)", " "}, {"123 Main Street", "10 (60%)", " "}}.

In still yet other embodiments, the address representation can be defined with percent confidences as well as absolute confidence values, e.g., Estimated floor number={{"234 Main Street (50%)", "8+/−1", " "}, {"123 Main Street (30%)", "10+1−2", " "}}.

In still yet other embodiments, if additional information is available about unpopulated buildings, they may be removed from the API response, or the user may be warned.

For example, if 234 Main Street were an abandoned building, e.g., Estimated floor number={{"123 Main Street", "10+/−2", " "}}, or Estimated floor number={{"234 Main Street", "8+/−1", "Unpopulated"}, {"123 Main Street", "10+/−2", " "}}.

In still yet other embodiments, if additional information about floor numbers that are restricted or off-limits (e.g., an unattended server room) is available, then those numbers may be removed from the API response. For example, if 234 Main Street has Floor 8 as a server room, then, Estimated floor number={{"234 Main Street", "7, 9", " "}, {"123 Main Street", "10+/−2", " "}}.

In still yet other embodiments, the building representation can be defined with percent confidences but only the building having the highest confidence value is returned, e.g., Estimated floor number={{"234 Main Street (60%)", "8+/−1", " "}.

In still yet other embodiments, the floor representation and the building representation can be defined with percent confidences, but only the building having the highest confidence value and the floor having the highest confidence value are returned, e.g., Estimated floor number={{"234 Main Street (60%)", "8 (80%)", " "}.

Regarding the process 1400 and other processes described herein, because each geographical region may have hundreds, or even thousands, of physical buildings, and each building may have many possible permutations of floor numbers and floor labels, and because large datasets of regional and cultural rules are considered, in addition to the consideration of large datasets which may contain known apartment numbers, elevator button information, etc., the processes disclosed herein are advantageously performed by one or more mobile devices and/or servers and are not performed manually. This is because such mobile devices are operable to measure physical atmospheric effects and to transmit data representative of those measurements to one or more servers that are operable to access and operate on large datasets. For example, selection of altitude envelope distribution constraints, validation of altitude envelope distribution constraints, construction of a range of altitude envelope distributions, application of altitude envelope distribution constraints to the altitude envelope distributions, generation of resultant aggregate altitude envelope distributions, and generation of an absolute aggregate altitude envelope distribution may be repeated hundreds, if not thousands of times for a region. Additionally, there may be hundreds, if not thousands of regions considered. Because the processes disclosed herein are advantageously performed by mobile devices and/or servers, datasets that provide mappings of an estimated altitude to an estimated floor number and/or floor label may advantageously be inexpensively and quickly created for any number of regions as compared to manual processes that involve surveying buildings and/or manually retrieving and manually creating such mappings.

In some embodiments, aggregate floor distributions may be selectively chosen per floor number if so desired in order to tighten the bounds on individual floor distributions. In some embodiments, the floor-to-floor separation, as well as the floor-to-ceiling separation, and the boundary thickness, do need to be uniform throughout a building. In some embodiments, subterranean floors (i.e., basement levels) can be mapped using a similar technique, though building depths (analogous to building heights) may not be well documented nor easy to assess, and the number of basement floors may not be well documented nor easy to assess. In such embodiments, some assumptions about ventilation and building foundation may be made to restrict the number of below-ground stories and/or building depths. Additionally, in some embodiments, assumptions may be directly made about the number of below-ground levels/stories and/or depths. For example, one assumption may be that a building may have no more than five below-ground levels/stories, may be no more than 20 m deep, or have no more than five below-ground levels/stories that sum to more than 20 m of depth. Other assumptions concerning building depth and below-ground levels/stories may be made and may be based on the geographical region in which the building is located.

Since building floors can reasonably be assumed to be level (or flat) whereas terrain may not necessarily be level, in some embodiments it is preferred to convert from a mobile device's height-above-ellipsoid altitude value to an estimated floor number, described below, directly using the building's absolute aggregate altitude envelope distribution instead of from a mobile device's height-above-terrain. For example, in a building erected on sloped terrain with a portion of the lower levels underground on one side of the building, as a user walks horizontally around the building's floor without changing floors, the height-above-ellipsoid value is expected to not change very much. However, the mobile device's height-above-terrain value may change if the underlying terrain database indicates sloped terrain (that has since been excavated out for the building to be erected). Therefore, height-above-terrain is potentially less stable than height-above-ellipsoid and could inadvertently induce errors in estimated floor number reporting.

The estimated altitude data of a mobile device can be measured in many ways, as mentioned above, such as Height Above Ellipsoid (HAE), Mean Sea-Level (MSL), Height Above Terrain (HAT), etc. If the building database includes data that is measured/represented in height relative to the ground (i.e., HAT), meaning the building database provided aggregate altitude envelope distributions for different floors/floor numbers, then the estimated altitude data of a mobile device would need to be converted to HAT if necessary, by processes known in the art. Additionally, if the building database includes data that is measured/represented in absolute height (i.e. HAE or MSL), meaning the building database provided absolute aggregate altitude envelope distributions for different floors/floor numbers, then the estimated altitude data of a mobile device would need to be converted to HAE or MSL if necessary, by processes known in the art. However, caution needs to be exercised as per the limitations of using HAT directly, as mentioned above.

Any method (also referred to as a "process" or an "approach") described or otherwise enabled by the disclosure herein may be implemented by hardware components (e.g., machines), software modules (e.g., stored in machine-readable media), or a combination thereof. In particular, any method described or otherwise enabled by the disclosure herein may be implemented by any concrete and tangible system described herein. By way of example, machines may include one or more computing device(s), processor(s), controller(s), integrated circuit(s), chip(s), system(s) on a chip, server(s), programmable logic device(s), field-programmable gate array(s), electronic device(s), special-purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media, including but not limited to one or more non-volatile or volatile storage media, removable or non-removable media, integrated circuit media, magnetic storage media, optical storage media, or any other storage media, including RAM, ROM, and EEPROM, that may be patented under the laws of the jurisdiction in which this application is filed, but does not include machine-readable media that cannot be patented under the laws of the jurisdiction in which this application is filed (e.g., transitory propagating signals). Methods disclosed herein provide sets of rules that are performed. Systems that include one or more machines and one or more non-transitory machine-readable media for implementing any method described herein are also contemplated herein. One or more machines that perform or implement, or are configured, operable, or adapted to perform or implement operations comprising the steps of any methods described herein are also contemplated herein. Each method described herein that is not prior art represents a specific set of rules in a process flow that provides significant advantages in the field of characterizing height-above-terrain confidence. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any, and at least one refer to one or more. The terms may or can are used herein to indicate an example, not a requirement— e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

FIG. 24 illustrates components of a transmitter 2401, a mobile device 2402, and a server 2403, in accordance with some embodiments. Examples of communication pathways are shown by arrows between components.

By way of example in FIG. 24, each of the transmitters 2401 may include: a mobile device interface 11 for exchanging information with a mobile device (e.g., antenna(s) and RF front-end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, humidity, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example in FIG. 24, the mobile device 2402 may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 (such as barometers and temperature sensors) for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure from the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example in FIG. 24, the server 2403 may include: a mobile device interface 31 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon is known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. No. 9,057,606, issued Jun. 16, 2015. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

What is claimed is:

1. A method, comprising:
selecting a set of altitude envelope distribution constraints for a physical building;
generating a set of a plurality of altitude envelope distributions for the physical building in accordance with the set of altitude envelope distribution constraints, each altitude envelope distribution comprising a plurality of first altitude envelopes, each of the first altitude envelopes corresponding to a respective estimated floor number of the physical building, each floor number corresponding to multiple altitude envelopes;
generating an aggregate altitude envelope distribution for the physical building using the set of the plurality of altitude envelope distributions and in accordance with the set of altitude envelope distribution constraints, the aggregate altitude envelope distribution comprising a plurality of second altitude envelopes, each of the second altitude envelopes corresponding to a respective estimated floor number of the physical building;
determining a reference altitude of the physical building; and
determining an absolute aggregate altitude envelope distribution using the reference altitude and the aggregate altitude envelope distribution, the absolute aggregate altitude envelope distribution comprising a plurality of third altitude envelopes, each of the third altitude envelopes corresponding to a respective estimated floor number of the physical building.

2. The method of claim 1, wherein:
generating a set of altitude envelope distributions for the physical building in accordance with the set of altitude envelope distribution constraints comprises:
generating an initial set of altitude envelope distributions using a first altitude envelope distribution constraint;
filtering the initial set of altitude envelope distributions using a second altitude envelope distribution constraint; and
using any remaining altitude envelope distributions of the initial set of altitude envelope distributions after the filtering as the set of altitude envelope distributions.

3. The method of claim 2, wherein:
the first altitude envelope distribution constraint is a maximum number of floors; and
the second altitude envelope distribution constraint is a maximum building height.

4. The method of claim 2, wherein:
the initial set of altitude envelope distributions comprises a plurality of altitude envelope distributions; and
each of the altitude envelope distributions comprises a minimum altitude value and a maximum altitude value associated with each floor number of that altitude envelope distribution.

5. The method of claim 1, wherein:
the set of altitude envelope distribution constraints is selected from a list of constraints comprising a minimum building height, a maximum building height, a minimum floor height, a maximum floor height, a minimum number of floors, and a maximum number of floors.

6. The method of claim 5, wherein:
selecting the set of altitude envelope distribution constraints comprises validating a set of initially selected altitude envelope distribution constraints individually and in combination based on a morphology of a region that includes the physical building.

7. The method of claim 1, further comprising:
identifying an estimated altitude of a mobile device;
for each floor number of the absolute aggregate altitude envelope distribution, upon determining that the estimated altitude is within an altitude envelope that corresponds to the floor number, adding that floor number to a list of estimated floor numbers; and returning, to an endpoint, the list of estimated floor numbers.

8. The method of claim 1, further comprising:
identifying an estimated altitude of a mobile device;
for each floor number of the absolute aggregate altitude envelope distribution, calculating a vertical central tendency of an altitude envelope that corresponds to that floor number;
for each floor number of the absolute aggregate altitude envelope distribution, calculating a distance magnitude between the estimated altitude and the vertical central tendency that corresponds to that floor number;
for each floor number of the absolute aggregate altitude envelope distribution, conditionally adding that floor number to a list of estimated floor numbers based on the distance magnitude for that floor number; and
returning, to an endpoint, the list of estimated floor numbers.

9. The method of claim 8, wherein:
conditionally adding that floor number to a list of estimated floor numbers based on the distance magnitude for that floor number comprises:
adding that floor number to the list of estimated floor numbers if that floor number's corresponding distance magnitude is a smallest distance magnitude as compared to distance magnitudes corresponding to other floor numbers.

10. The method of claim 8, wherein:
conditionally adding that floor number to a list of estimated floor numbers based on the distance magnitude for that floor number comprises:
adding that floor number to the list of estimated floor numbers if that floor number's corresponding distance magnitude is less than a given threshold.

11. The method of claim 8, wherein:
conditionally adding that floor number to a list of estimated floor numbers based on the distance magnitude for that floor number comprises:
adding all possible floor numbers to the list of estimated floor numbers ordered by their respective distance magnitudes.

12. The method of claim 1, further comprising:
identifying estimated altitude data of a mobile device;
for each floor number of the absolute aggregate altitude envelope distribution, calculating an altitude overlap value using the estimated altitude data and an altitude envelope that corresponds to that floor number;
for each floor number of the absolute aggregate altitude envelope distribution, conditionally adding that floor number to a list of estimated floor numbers based on the calculated altitude overlap value for that floor number; and
returning, to an endpoint, the list of estimated floor numbers.

13. The method of claim 12, wherein:
conditionally adding that floor number to a list of estimated floor numbers based on the calculated altitude overlap value for that floor number comprises:
adding that floor number to the list of estimated floor numbers if the calculated altitude overlap value for that floor number is a largest calculated altitude overlap value as compared to calculated altitude overlap values corresponding to other floor numbers.

14. The method of claim 12, wherein:
conditionally adding that floor number to a list of estimated floor numbers based on the calculated altitude overlap value for that floor number comprises:

adding that floor number to the list of estimated floor numbers if that floor number's corresponding calculated altitude overlap value is greater than a given percentage threshold.

15. The method of claim 12, wherein:
conditionally adding that floor number to a list of estimated floor numbers based on the calculated altitude overlap value for that floor number comprises:
adding all possible floor numbers to the list of estimated floor numbers, ordered by their respective calculated altitude overlap values.

16. The method of claim 1, further comprising:
mapping each estimated floor number of the physical building to identically named estimated floor labels;
removing estimated floor labels from the mapping based on one or both of regional and cultural criteria;
adding additional estimated floor labels to the mapping; and
aligning the estimated floor numbers to the estimated floor labels.

17. The method of claim 1, further comprising:
identifying an estimated position of a mobile device and an estimated altitude of the mobile device;
identifying one or more physical buildings that correspond to the estimated position of the mobile device;
for each of the one or more physical buildings, identifying a respective absolute aggregate altitude envelope distribution that is associated with that building;
for each of the one or more physical buildings, determining a list of estimated floor numbers using the estimated altitude of the mobile device and the respective absolute aggregate altitude envelope distribution that is associated with that building; and
for each of the one or more physical buildings returning, to an endpoint, that list of estimated floor numbers.

18. The method of claim 1, wherein:
the reference altitude is an altitude of a ground floor of the physical building and is determined by i) querying altitudes of a terrain database within a footprint of the physical building and averaging the altitudes across the footprint of the physical building, or ii) retrieving the altitude of the ground floor of the physical building from a building database.

19. The method of claim 1, wherein:
the reference altitude is an altitude of a ground floor of the physical building and is determined by querying altitudes of a terrain database outside of a footprint of the physical building and averaging the altitudes.

20. A system comprising one or more servers that are operable to:
select a set of altitude envelope distribution constraints for a physical building;
generate a set of a plurality of altitude envelope distributions for the physical building in accordance with the set of altitude envelope distribution constraints, each altitude envelope distribution comprising a plurality of first altitude envelopes, each of the first altitude envelopes corresponding to a respective estimated floor number of the physical building, each floor number corresponding to multiple altitude envelopes;
generate an aggregate altitude envelope distribution for the physical building using the set of the plurality of altitude envelope distributions and in accordance with the set of altitude envelope distribution constraints, the aggregate altitude envelope distribution comprising a plurality of second altitude envelopes, each of the second altitude envelopes corresponding to a respective estimated floor number of the physical building;

determine a reference altitude of the physical building; and determine an absolute aggregate altitude envelope distribution using the reference altitude and the aggregate altitude envelope distribution, the absolute aggregate altitude envelope distribution comprising a plurality of third altitude envelopes, each of the third altitude envelopes corresponding to a respective estimated floor number of the physical building.

* * * * *